(12) United States Patent
Nakanishi

(10) Patent No.: US 7,483,937 B2
(45) Date of Patent: Jan. 27, 2009

(54) PARALLEL PROCESSING METHOD FOR INVERSE MATRIX FOR SHARED MEMORY TYPE SCALAR PARALLEL COMPUTER

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 772 days.

(21) Appl. No.: 10/692,533

(22) Filed: Oct. 24, 2003

(65) Prior Publication Data

US 2004/0093470 A1    May 13, 2004

Related U.S. Application Data

(63) Continuation-in-part of application No. 10/288,984, filed on Nov. 6, 2002, now abandoned.

(30) Foreign Application Priority Data

Mar. 22, 2002 (JP) ............................. 2002-079909
Mar. 18, 2003 (JP) ............................. 2003-074548

(51) Int. Cl.
*G06F 7/52* (2006.01)
*G06F 7/32* (2006.01)

(52) U.S. Cl. ..................................... 708/607; 708/520

(58) Field of Classification Search .................. 708/607, 708/520
See application file for complete search history.

(56) References Cited

U.S. PATENT DOCUMENTS 5,226,171 A    7/1993    Hall et al.

5,251,097 A    10/1993    Simmons et al.

(Continued)

FOREIGN PATENT DOCUMENTS

JP    08-166941    6/1996

(Continued)

OTHER PUBLICATIONS

Huang et al; "Efficient Storage Scheme amd Algorithms for W-Matrix Vector Multiplication on Vector Computers"; IEEE Trans. on Power Systems, vol. 9, No. 2; pp. 1083-1091; May 1994.

(Continued)

*Primary Examiner*—Tan V Mai
(74) *Attorney, Agent, or Firm*—Greer, Burns & Crain, Ltd.

(57) ABSTRACT

A Matrix decomposition (LU decomposition) is carried out on a block E and H. Then, a block B is updated using an upper triangular portion of the block E, and a block D is updated using a lower triangular portion of the block E. At this time, in an LU decomposition, blocks F and I have been updated. Then, using the blocks B, D, F, and H, blocks A, C, G, and I are updated, an upper triangular portion of the block E is updated, and finally, the blocks D and F are updated. Then, the second updating process is performed on the block E. Using the result of the process, the blocks B and H are updated. Finally, the block E is updated, and the pivot interchanging process is completed, thereby terminating the process. These processes on the blocks are performed in a plurality of divided threads in parallel.

11 Claims, 29 Drawing Sheets

U.S. PATENT DOCUMENTS

| | | |
|---|---|---|
| 5,301,342 A | 4/1994 | Scott |
| 5,333,117 A | 7/1994 | Hat et al. |
| 5,428,803 A | 6/1995 | Chen et al. |
| 5,490,278 A | 2/1996 | Mochizuki |
| 5,561,784 A | 10/1996 | Chen et al. |
| 5,596,518 A | 1/1997 | Toyokura et al. |
| 5,604,911 A * | 2/1997 | Ushiro .......................... 703/2 |
| 7,003,542 B2 * | 2/2006 | Devir ........................ 708/520 |
| 7,065,545 B2 * | 6/2006 | Quintero-de-la-Garza ... 708/446 |

FOREIGN PATENT DOCUMENTS

JP   2002-163246   6/2002

OTHER PUBLICATIONS

Mrityunjoy Chakraborty; "An Efficient Algorithm for Solving General Periodic Toeplitz Systems"; IEEE Trans. on Signal Processing, Vo. 46, No. 3; pp. 784-787; Mar. 1998.

Software for Matrix Calculation; pp. 106-131; 1991.

\* cited by examiner

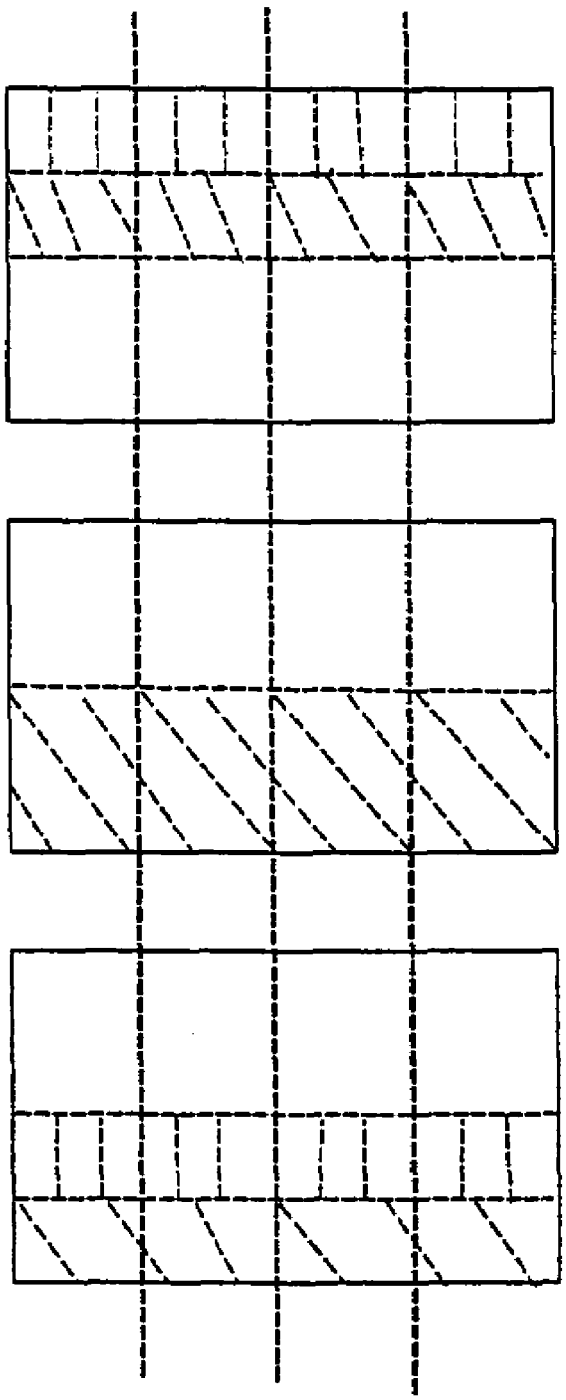
FIG.7E
FIG.7C
FIG.7A
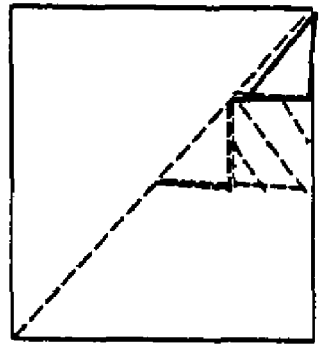
FIG.7F
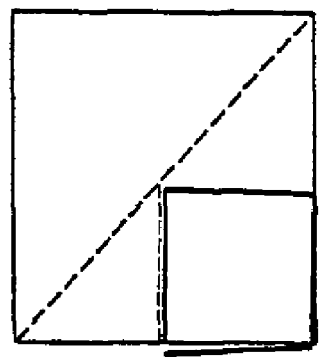
FIG.7D
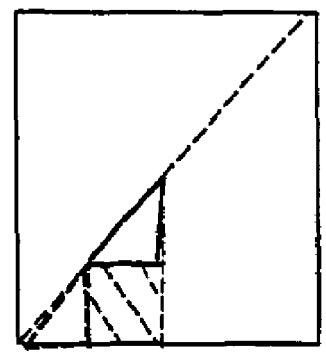
FIG.7B

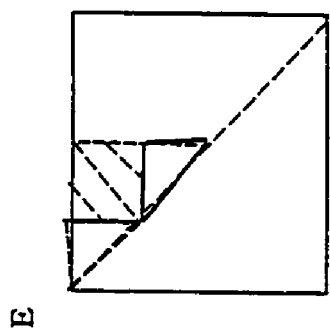
FIG. 8A
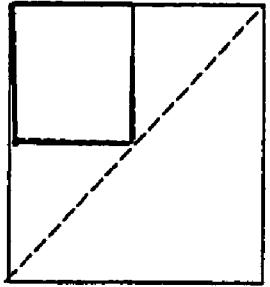
FIG. 8B
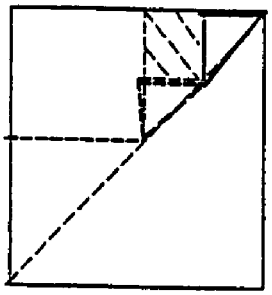
FIG. 8C
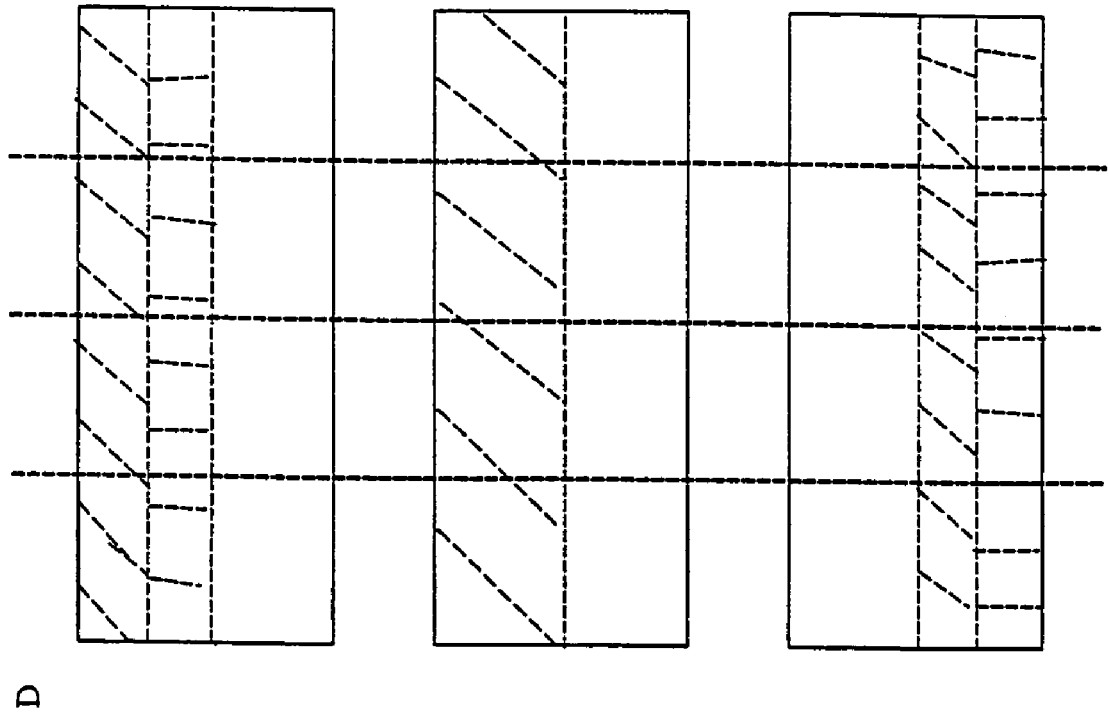

```
c   PARALLEL ALGORITHM OF INVERSE MATRIX
    subroutine inversion(a,k,n)
    shared array a(k,n), ip(n)
    create threads
    set nothrd and numthrd
c   nothrd IS THREAD NUMBER 1 ~ #TH, numthrd=#TH (TOTAL NUMBER OF THREADS)
    iblk=BLOCK WIDTH
    nb=(n+blk-1)/blk
    do i=1,nb-1
    nbase=(nb-1)*blk
    call LU(a,k,n,nbase,blk,ip,nothrd,numthrd)
             ! LU DECOMPOSITION IS PERFORMED ON SPECIFIED BLOCK, ROW BLOCK IS
UPDATED,
             ! OPERATION FOR UPDATING LOWER RIGHT SQUARE BLOCK MATRIX ARE PERFORMED
             ! IN PARALLEL. ROW INTERCHANGING INFORMATION IS RETURNED TO
               ip(nbase+1:nbase-blk).
             ! FOR PARALLEL ALGORITHM OF THIS PORTION, REFER TO JAPANESE PATENT
               APPLICATION NO. HEI-12-358232
    do i=nbase+1, nbase+blk
    if(ip(i)>i)then
    exchange(a(i,1:nbase),a(ip(i),1:nbase))
    endif
    enddo
    call update(a,k,n,nbase,blk,nothrd,numthrd)
    enddo
    nbase=(nb-1)*blk
    blklast=n-nbase
    call LU(a,k,n,nbase,blklast,nothrd,numthrd)
    call update(a,k,n,nbase,blklast,nothrd,numthrd)
    return
    end
```

FIG. 9

```
c      ROUTINE OF UPDATING REMAINING PORTION ACCORDING TO INFORMATION
       ABOUT BLOCK LU DECOMPOSITION
       subrourine update(a,k,n,nbase,blk,nothrd,numthrd)
       call b-update(a,k,n,nbase,blk,nothrd,numthrd)
       call d-update(a,k,n,nbase,blk,nothrd,numthrd)
       call c-update(a,k,n,nbase,blk,nothrd,numthrd)
       call a-update(a,k,n,nbase,blk,nothrd,numthrd)
       call g-update(a,k,n,nbase,blk,nothrd,numthrd)
       BARRIER SYNC
       if(nothread=1)then
c      UPDATE 1 OF e
       call e-update1(a(nbase+1,nbase+1),k,n,blk)
       endif
       BARRIER SYNC
       len←(nbase+numthrd-1)/numthrd
       is←(nothrd-1)*len+1
       ie←nothrd*len
       call df-update(a(nbase+1,1),k,n,a(nbase+1,nbase+1),is,ie,blk)
       nbase2←nbase+blk
       len←(n-nbase2+numthrd-1)/numthrd
       is2←nbase2+(nothrd-1)*len+1
       ie2←nbase2+nothrd*len
       call df-update(a(nbase+1,1),k,n,a(nbase+1,nbase+1),is,ie,blk)
       BARRIER SYNC
       if(nothread=1)then
c      UPDATE 2 OF e
       call e-update2(a(nbase+1,nbase+1),k,n,blk)
       endif
       BARRIER SYNC
       len←(nbase+numthrd-1)/numthrd
       is←(nothrd-1)*len+1
       ie←nothrd*len
       call bh-update(a(1,nbase+1),k,n,a(nbase+1,nbase+1),is,ie,blk)
       nbase2←nbase+blk
       len←(n-nbase2+numthrd-1)/numthrd
       is2←nbase2+(nothrd-1)*len+1
       ie2←nbase2+nothrd*len
       call bh-update(a(1,nbase+1),k,n,a(nbase+1,nbase+1),is,ie,blk)
       BARRIER SYNC
       if(nothread=1)then
c      UPDATE 3 OF e
       call e-update3(a(nbase+1,nbase+1),k,n,blk)
       endif
       BARRIER SYNC
       len=(n+numthrd-1)/numthrd
       is=(nothrd-1)*len+1
       ie=min(n,nothrd*len)
       if(ip(i)>i)then
       exchange(a(is:ie,i),a(is:ie,ip(i)))
       endif
       enddo
       BARRIER SYNC eliminate threads return
       end
```

FIG. 10

```
c   UPDATE OF BLOCK B
    subroutine b-update(a, k, n, nbase, blk, nothrd, numthrd)
    shared array a(k, n)
    len←(nbase+numthrd-1)/numthrd
    is1←(nothrd-1)*len
    ie1←nothrd*len
    a(is:ie, iof+1:iof+blk)
    ←a(is:ie, iof+1:iof+blk)*TRU-U(iof+1:iof+blk, iof+1:iof+blk)-1
      ! TRU-U  UPPER TRIANGULAR MATRIX WITH DIAGONAL ELEMENT=1.0
    return
    end c   UPDATE OF BLOCK D
    subroutine d-update(a, k, n, nbase, blk, nothrd, numthrd)
    shared array a(k, n)
    len←(nbase+numthrd-1)/numthrd
    is1←(nothrd-1)*len
    ie1←nothrd*lenis1
    iof=nbase
    a(is:ie, iof+1:iof+blk)
    ←TRL(iof+1:iof+blk, iof+1:iof+blk)-1*a(is:ie, iof+1:iof+blk)
        ! TRL INDICATES LOWER TRIANGULAR MATRIX
    return
    end
```

FIG. 11

```
c    UPDATE OF BLOCK C
     subroutine c-update(a, k, n, nbase, blk, nothrd, numthrd)
     shared array a(k, n)
     nbase2←nbase+blk
     iof=nbase
     len←(n-nbase2+numthrd-1)/numthrd
     is2←nbase2+(nothrd-1)*len+1
     ie2←nbase2+nothrd*len
     a(1:iof, is2:ie2)
     ←a(1:iof, is2:ie2)
     -a(1:iof, iof+1:iof+blk)*a(iof+1:iof+blk, is2:ie2)
     return
     end c    UPDATE OF BLOCK A
     subroutine a-update(a, k, n, nbase, blk, nothrd, numthrd)
     shared array a(k, n)
     len←(nbase+numthrd-1)/numthrd
     is2←(nothrd-1)*len
     ie2←nothrd*len
     iof=nbase
     a(1:iof, is2:ie2)
     ←a(1:iof, is2:ie2)
     -a(1:iof, iof+1:iof+blk)*a(iof+1:iof+blk, is2:ie2)
     return
     end
```

FIG. 12

```
c   UPDATE OF BLOCK G
    subroutine g-update(a, k, n, nbase, blk, nothrd, numthrd)
    shared array a(k, n)
    len←(nbase+numthrd-1)/numthrd
    is2←(nothrd-1)*len
    ie2←nothrd*len
    iof←nbase+blk
    a(iof+1:n, is2:ie2)
    ←a(iof+1:n, is2:ie2)
    -a(iof+1:n, iof+1:iof+blk)*a(iof+1:iof+blk, is2:ie2)
    return
    end c   FIRST UPDATE OF BLOCK E
    subroutine e-update1(s, k, n, blk)
    shared array s(k, n)

do i=1, blk
    s(1:i-1, i+1:blk)←s(1:i-1, i+1:blk)-s(1:i-1, i)*s(l, i+1:blk)
    enddo
    return
    end c   SECOND UPDATE OF BLOCK E
    subroutine e-update2(s, k, n, blk)
    shared array s(k, n)

do i=1, blk
    tmp←1.0/s(i, i)
    s(i, 1:i-1)←tmp*s(i, 1:i-1)
    s(i+1:blk, 1:i-1)←s(i+1:blk, 1:i-1)-s(i, 1:i-1)*s(i+1:blk, i)
    s(i+1:blk, i)←-s(i+1:blk, i)*tmp
    s(i, i)←tmp
    enddo
    return
    end
```

F I G. 1 3

```
c     FINAL UPDATE OF BLOCK E
      subriutine e-update3(s,k,n,blk)
      shared array s(k,n)

do i=1,blk
      s(1:i-1,1:i-1)←s(1:i-1,1:i-1)-s(1:i-1,i)*s(i,1:i-1)
      s(1:i-1,i)←-s(1:i-1,i)*a(i,i)
      enddo
      return
      end c     UPDATE OF BLOCKS D AND F
      subroutine df-update(a,k,n,s,is,ie,len)
      shared array a(k,*),s(k,*)
      if(len<10)then
      do i=1,len
      a(1:i-1,is:ie)←a(1:i-1,is:ie)-s(1:i-1,i)*a(i,is:ie)
      enddo
      else
      if(len>=32 or len<=20)then
      len1←len/2
      len2←len-len1
      else
      len1←len/3
      len2←len-len1
      endif
      call df-update(a,k,n,s,is,ie,len1)
      a(1:len1,is:ie)
      ←a(1:len1,is:ie)-s(1:len1,len1+1:len)*a(len1+1:len,is:ie)
      call df-update(a(len1+1,1),k,n,s(len1+1,len1+1),is,ie,len2)
      endif
      return
      end
```

FIG. 14

```
c     UPDATE OF BLOCKS B AND H
      subroutine bh-update(a, k, n, s, is, ie, len)
      shared array a(k,*), s(k,*)
      if(len<10)then
      do i=1, len
      a(is:ie, i)←a(is:ie, i)*s(i, i)
      a(is:ie, i)←a(is:ie, i)-a(is:ie, i+1:len)*s(i+1:len, i)
      enddo
      else
      if(len>=32 or len<=20)then
      len1←len/2
      len2←len-len1
      else
      len1←len/3
      len2←len-len1
      endif
      call bh-update(a, k, n, s, is, ie, len1)
      a(is:ie, 1:len1)←a(is:ie, 1:len1)
                   -a(is:ie, len1+1:len)*s(len1+1:len, 1:len1)
      call bh-update(a(1, len1+1), k, n, s(len1+1, len1+1), is, ie, len2)
      endif
      return
      end
```

FIG. 15

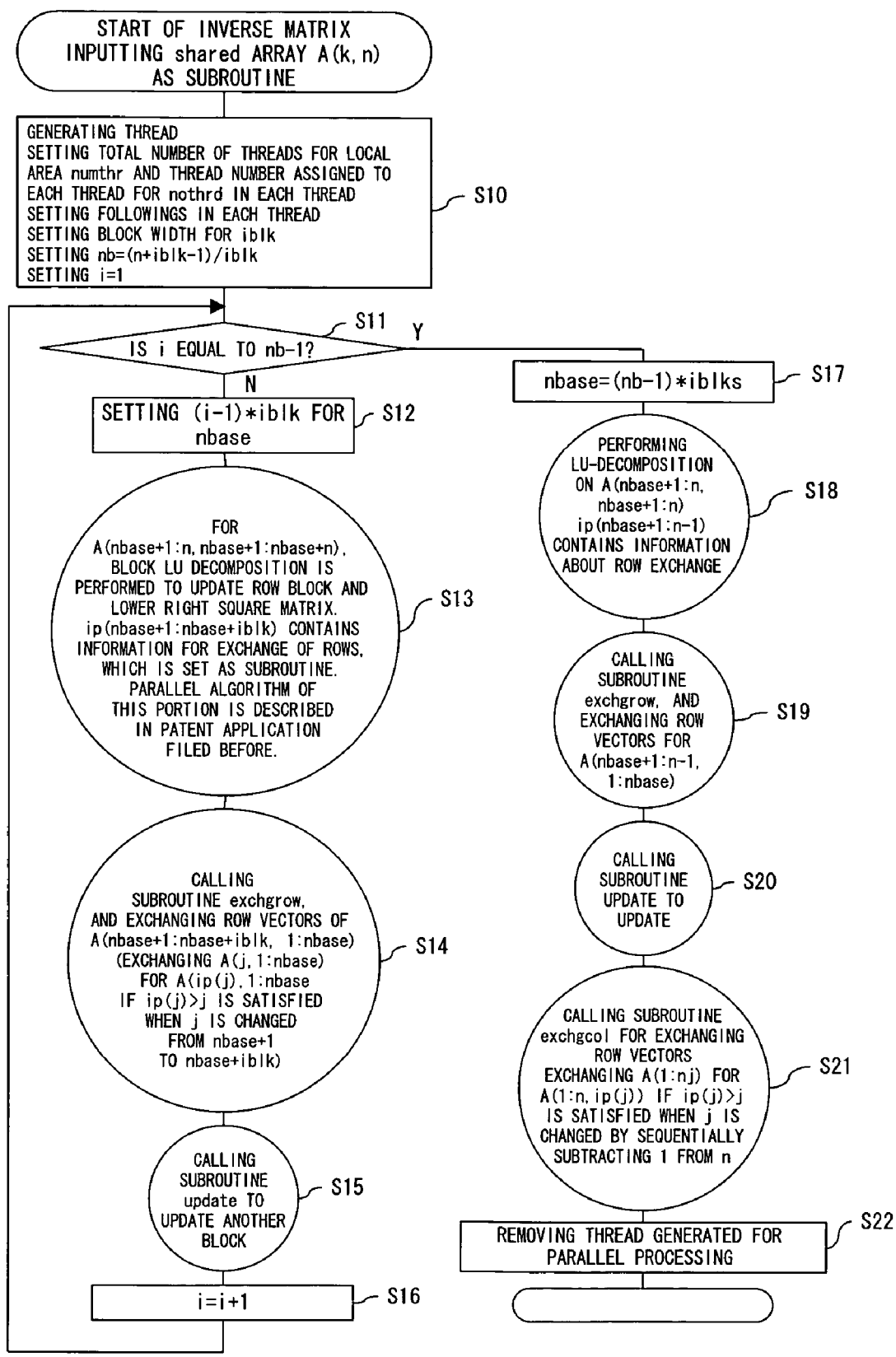
F I G. 1 6

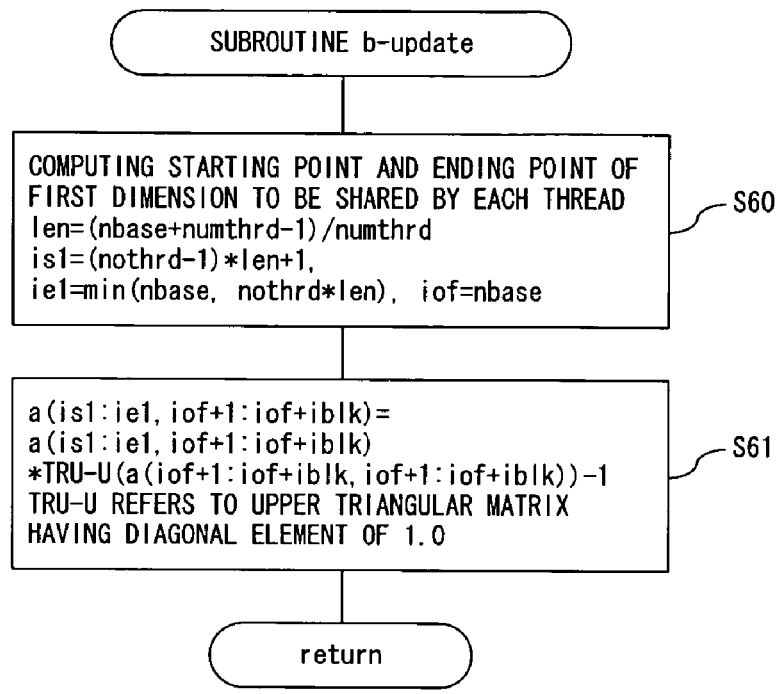
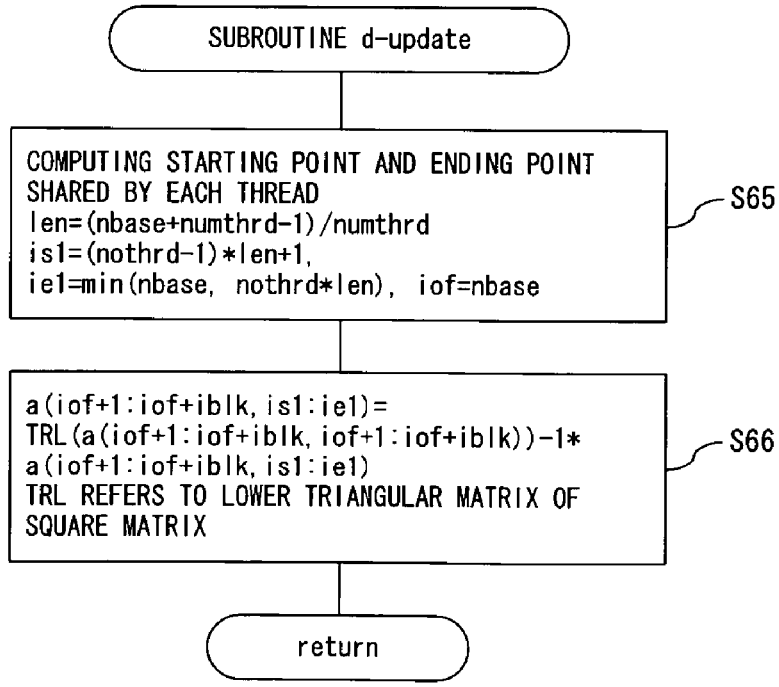
FIG. 19

PARALLEL PROCESSING METHOD FOR INVERSE MATRIX FOR SHARED MEMORY TYPE SCALAR PARALLEL COMPUTER

CROSS REFERENCE

This patent application is a continuation in part application of the previous U.S. patent application, title "PARALLEL PROCESSING METHOD FOR INVERSE MATRIX FOR SHARED MEMORY TYPE SCALAR PARALLEL COMPUTER", filed on Nov. 6, 2002, now abandoned application Ser. No. 10/288,984, herein incorporated by reference.

BACKGROUND OF THE INVENTION

1. Field of the Invention

The present invention relates to an arithmetic process using a shared memory type scalar parallel computer.

2. Description of the Related Art

Conventionally, when an inverse matrix of a matrix is obtained using a vector computer, a computing method based on the Gauss-Jordan method and that operations are quickly performed by utilizing fast-access memory. For example, the methods such as a double unrolling method, etc. in which an instruction in a loop is unrolled into a single list of instructions and executed once.

Described below is the method of obtaining an inverse matrix in the Gauss-Jordan method (or referred to simply as the Gauss method). (In the explanation below, the interchange of pivots is omitted, but a process of interchanging row vectors for the interchange of pivots is actually performed).

Assume that A indicates a matrix for which an inverse matrix should be calculated, and x and y indicate arbitrary column vectors. Ax=y is expressed as simultaneous linear equations as follows when matrix elements are explicitly written.

$a_{11}x_1 + a_{12}x_2 + \ldots + a_{1n}x_n = y_1$ $a_{21}x_1 + a_{22}x_2 + \ldots + a_{2n}x_n = y_2$

...

$a_{n1}x_1 + a_{n2}x_2 + \ldots + a_{nn}x_n = y_2$

If the above listed equations are transformed into By=x, then B is an inverse matrix of A, thereby obtaining an inverse matrix.

1) The equation in the first row is divided by $a_{11}$.
2) Compute the i-th row (i>1)–the first row×$a_{i1}$.
3) To obtain the coefficient of 1 for x2 of the equation in the second row, multiply the second row by a reciprocal of the coefficient of x2.
4) Compute the i-th row (i>2)–the second row×$a_{i2}$.
5) The above mentioned operation is continued up to the (n−1)th row.

The interchange of column vectors accompanying the interchange of pivots is described below.

Both sides of Ax=y are multiplied by the matrix P corresponding to the interchange of pivots.

PAx=Py=z

When the following equation holds with the matrix B, x=Bz then B is expressed as follows.

$B = (PA)^{-1} = A^{-1}P^{-1}$

That is, by right-multiplying the obtained B by P, an inverse matrix of A can be obtained. Actually, it is necessary to interchange the column vectors.

In the equation, $P = P_n P_{n-1} \ldots P_1$, and $P_n$ is an orthogonal transform having matrix elements of $P_{ii}=0$, $P_{ij}=1$, $P_{jj}=0$, and $P_{ji}=1$.

In the vector computer, an inverse matrix is computed in the above mentioned method based on the assumption that the operation of the memory access system can be quickly performed. However, in the case of the shared memory type scalar computer, the frequency of accessing shared memory increases with an increasing size of a matrix to be computed, thereby largely suppressing the performance of a computer. Therefore, it is necessary to perform the above mentioned matrix computation by utilizing the fast-accessing cache memory provided for each processor of the shared memory type scalar computer. That is, since the shared memory is frequently accessed if computation is performed on each row or column of a matrix, it is necessary to use an algorithm of localizing the computation assigned to processors by dividing the matrix into blocks, each processor processing the largest possible amount of data stored in the cache memory, and then accessing the shared memory, thereby reducing the frequency of accessing the shared memory.

SUMMARY OF THE INVENTION

The present invention aims at providing a method of computing an inverse matrix at a high speed in a parallel process.

The method according to the present invention is a parallel processing method for an inverse matrix for shared memory type scalar parallel computer, and includes the steps of: specifying a predetermined square block in a matrix for which an inverse matrix is to be obtained; decomposing the matrix into upper left, left side, lower left, upper, lower, upper right, right side, and lower right blocks surrounding the square block positioned in the center; dividing each of the decomposed blocks into the number of processors and LU-decomposing the square block and the lower, right side, and lower right blocks in parallel; updating the left side, upper, lower, and right side blocks in parallel in a recursive program, and further updating in parallel using the blocks updated in the recursive program on the upper left, lower left, upper right, and lower right blocks; updating a predetermined square block in plural stages using one processor; and setting the position of the square block such that it can sequentially move on the diagonal line of the matrix, and obtaining an inverse matrix of the matrix by repeating the above mentioned steps.

According to the present invention, the arithmetic operation of an inverse matrix is an updating process performed on each block, and each block is updated in parallel in a plurality of processors. Thus, the shared memory is accessed after the largest possible amount of operations are performed on a block stored in the cache provided for each processor, thereby realizing a localizing algorithm and performing a high-speed arithmetic operation for an inverse matrix.

BRIEF DESCRIPTION OF THE DRAWINGS

FIGS. 7A through 7F are diagrams (6) showing the order of computation according to an embodiment of the present invention;

FIGS. 8A through 8C are diagrams (7) showing the order of computation according to an embodiment of the present invention;

FIG. 9 shows a pseudo code (1) according to an embodiment of the present invention;

FIG. 10 shows a pseudo code (2) according to an embodiment of the present invention;

FIG. 11 shows a pseudo code (3) according to an embodiment of the present invention;

FIG. 12 shows a pseudo code (4) according to an embodiment of the present invention;

FIG. 13 shows a pseudo code (5) according to an embodiment of the present invention;

FIG. 14 shows a pseudo code (6) according to an embodiment of the present invention;

FIG. 15 shows a pseudo code (7) according to an embodiment of the present invention.

FIG. 16 is a flowchart (1) of the process of the pseudo code;
FIG. 19 is a flowchart (4) of the process of the pseudo code.

DESCRIPTION OF THE PREFERRED EMBODIMENTS

The present embodiment provides an algorithm of obtaining an inverse matrix of a given matrix. In the shared memory type scalar computer, it is necessary to increase a ratio of computation to load. Therefore, according to an embodiment of the present invention, a method of dividing a matrix into blocks as matrix products so that an arithmetic operation can be efficiently performed. Furthermore, the computation density is enhanced by updating part of the matrix with a recursively calculated product of matrices of varying dimensions.

Figure 1:
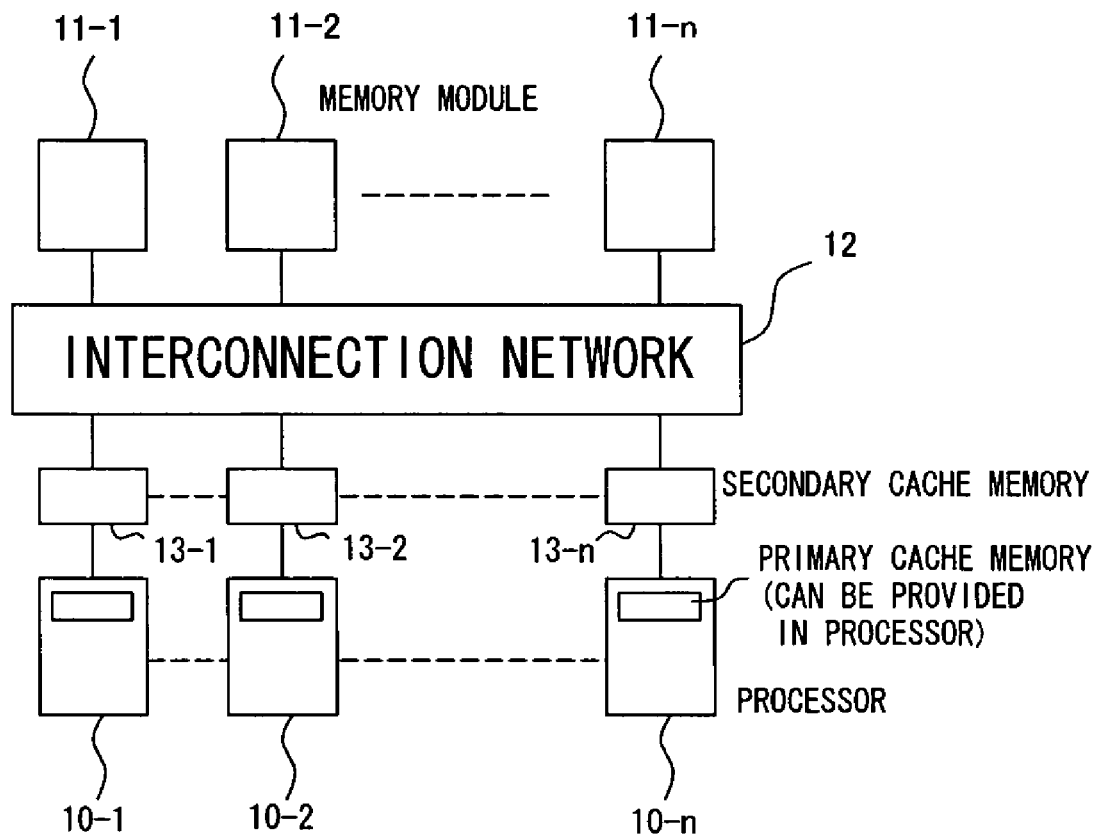
FIG. 1 shows the configuration of the hardware of the shared memory type scalar computer according to an embodiment of the present invention.

FIG. 1 shows the configuration of the hardware of the shared memory type scalar computer according to an embodiment of the present invention.

Processors 10-1 through 10-n have primary cache memory, and the primary cache memory can also be incorporated into a processor. Each of the processors 10-1 through 10-n is provided with secondary cache memory 13-1 through 13-n, and the secondary cache memory 13-1 through 13-n are connected to an interconnection network 12. The interconnection network 12 is provided with memory modules 11-1 through 11-n which are shared memory. The processors 10-1 through 10-n read necessary data for arithmetic operations from the memory modules 11-1 through 11-n, store the data in the secondary cache memory 13-1 through 13-n or the primary cache memory through the interconnection network 12, and perform arithmetic operations.

In this case, reading data from the memory modules 11-1 through 11-n to the secondary cache memory 13-1 through 13-n or the primary cache memory, and writing the computed data from the primary cache memory from the secondary cache memory 13-1 through 13-n or the primary cache memory to the memory modules 11-1 through 11-n are performed much more slowly than the operation speed of the processors 10-1 through 10-n. Therefore, if these writing and reading operations are frequently performed, then the performance of the entire computer is badly lowered.

Therefore, to maintain high performance of the entire computer, an algorithm of reducing the access to the memory modules 11-1 through 11-n and performing the largest possible amount of computation in a local system formed by the secondary cache memory 13-1 through 13-n, the primary cache memory, and the processors 10-1 through 10-n is required.

Therefore, according to an embodiment of the present invention, computation for an inverse matrix is performed as follows.

Only a rightward updating process is performed on a block having a certain block width in a matrix to be computed so that the information used in the updating process outside a block can be stored. That is, to update the remaining portion in the outer product of the row vector orthogonal to the column vector selected as the center in the past process is performed in the Gauss-Jordan method described above by referring to the conventional technology. That is, the method 2) of the above mentioned Gauss-Jordan is explicitly written as follows.

$$a_{ij} - c_{1j} \times a_{i1} \text{ (where } i,j>1: c_{1j} = a_{1j}/a_{11})$$

This equation means that by selecting the column vector in the first column as the center and selecting the row vector in the first row orthogonal to the selected vector, the matrix formed by the second and subsequent rows x the second and subsequent columns is updated by the outer product of the column vector in the first column and the row vector in the first row.

Furthermore, Ax=y can be rewritten using I as a unit matrix into Ax=Iy, and when A is converted in the Gauss-Jordan method, the unit matrix in the right side is also converted.

In updating the unit matrix, the element (i, i) of the column corresponding to the coefficient deleted in A is $1/a_{ii}$ in the right matrix, and the number of the other elements in the right matrix is obtained by multiplying the elements of the column vector deleted in A by $1/a_{ii}$ and then by −1. In a column block matrix, left elements are also to be deleted.

FIGS. 2 through 8 show the order of computation according to an embodiment of the present invention.

The order of computation is described below.

Figure 2:
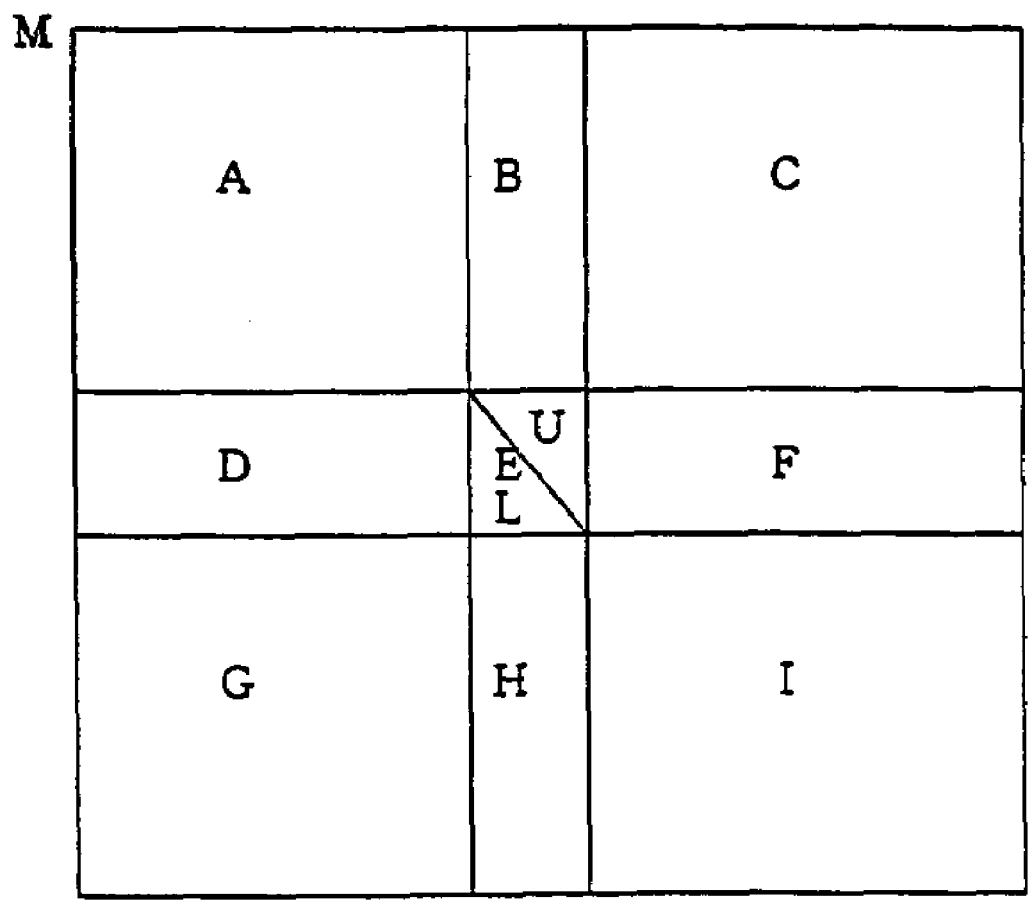
FIG. 2 is a diagram (1) showing the order of computation according to an embodiment of the present invention.

First, in FIG. 2, the matrix M is divided into blocks of column block matrices from the left side, and the updating process is performed in the above mentioned method.

1) E and H are LU decomposed (refer to Patent Application No. Hei-12-358232).
2) B is updated by B←BU$^{-1}$ using the upper triangular portion U of E.
3) D←L$^{-1}$D and F←L$^{-1}$D using the lower triangular portion of E.

4) A, C, G, and I are updated.

$$A \leftarrow A - B \times D, \ C \leftarrow C - B \times F, \ G \leftarrow G - H \times D, \ I \leftarrow I - H \times F$$

5) The upper triangular portion of E is updated. Since this portion has not been updated in the LU decomposition, it is updated at this timing.
6) The update of the upper portion of D and F is performed according to the information about D, E, and F.

At this time, the updating process is performed using a matrix product in the recursive program to enhance the computation density.

a) Recursive Program

The upper portions of D and F can be computed by the outer products of the respective row vectors and the column vector orthogonal to the row vector of E. To enhance the the density of computation, the following recursive program is used. The upper portions of D and F indicate, as described by referring to FIG. 8, the upper portions of the row blocks of D and F. As clearly shown in FIG. 8, D and F can be updated from the upper portions of the row blocks.

recursive subroutine rowupdate ( )
  if (update width<10) then
  The product of the matrix excluding the diagonal element and the row block matrix is subtracted from the upper triangular matrix of E (refer to the explanation of FIG. 8 for details).
  else
  c The update width is divided into a first half and a second half.
  The first half is updated.
  c Then, the second half is updated after calling rowupdate.
  call rowupdate ( )
  return
  end
7) Then, while moving the elements on the diagonal line in the lower right direction, the rectangular portion in the column direction on the lower left with respect to the diagonal line is updated. As a result, the information required to update B and H is generated.
8) The potions on the right of B and H are updated.

This process is performed as follows.

With d indicating a block width, the numbers are sequentially assigned from left to right starting with i, . . . , i+d−1.

A reciprocal of $a_{ii}$ is obtained. Other portions are obtained by dividing each portion by $a_{ii}$, and an inverse sign is assigned.

The portion on the left of the (i+1)th row is divided by $a_{i+1,i+1}$, and a reciprocal of $a_{i+1,i+1}$ is obtained.

The left portion is updated by multiplying the row i+1 by the column i+1 of the left portion, and then performing subtraction.

The above mentioned processes are repeated.

This portion is further divided into the following procedures. They also require the rearrangement into a recursive algorithm.

9) Finally, the rectangular portion in the row direction on the upper left portion of the element on the diagonal line of E is updated.
10) Finally performed is the process of interchanging the column vector into the inverse direction of the history of the interchange of the pivots.

Figure 3:
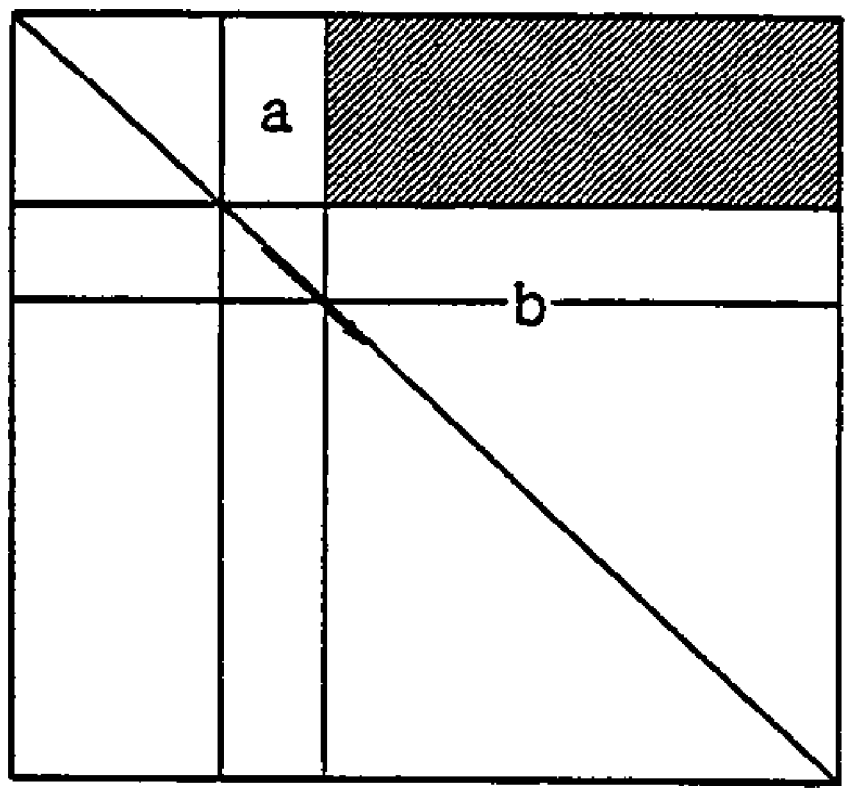
FIG. 3 is a diagram (2) showing the order of computation according to an embodiment of the present invention.

The portion updated in 5) above is updated by E2=E2−a×b while sliding the diagonal elements of the diagonal-line portion (E2) shown in FIG. 3 along the diagonal line.

This portion has not been updated in the LU decomposition. After the update, the information about the upper triangular matrix required to update D and F can be obtained.

Figure 4:
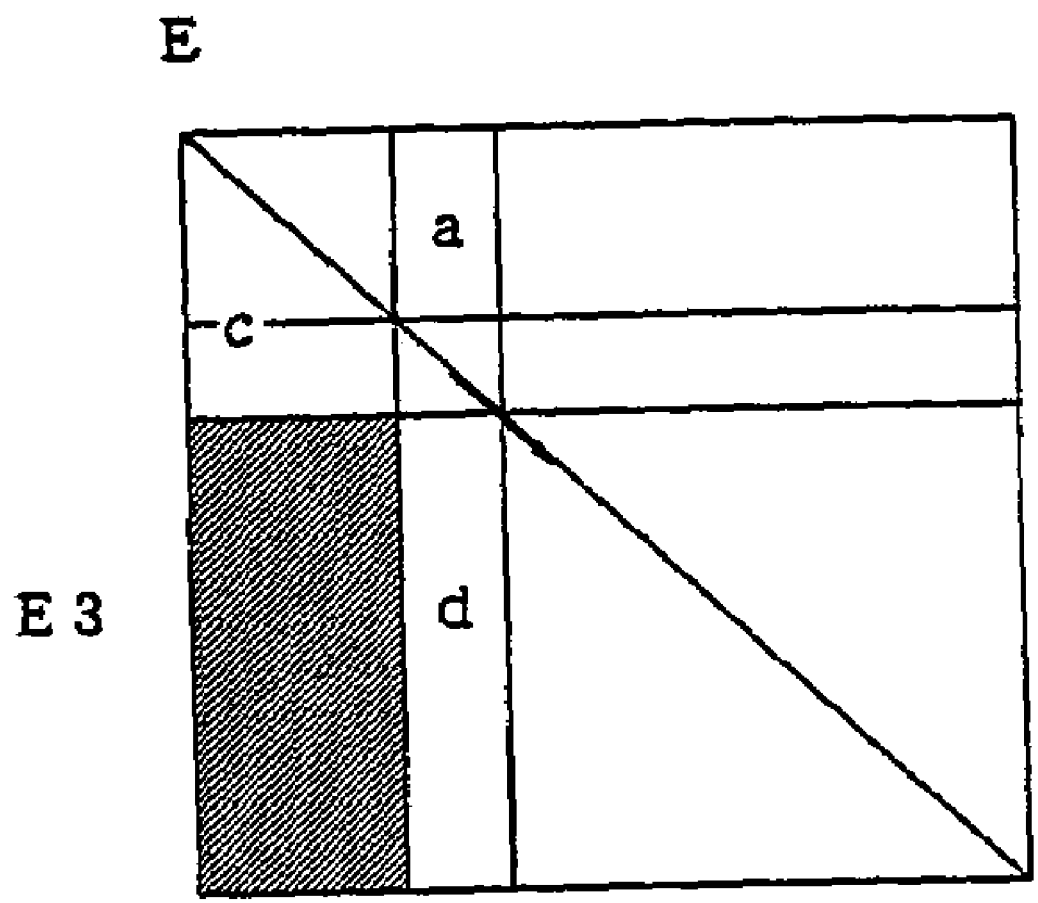
FIG. 4 is a diagram (3) showing the order of computation according to an embodiment of the present invention.

The portion updated in 7) above is updated by E3=E3−c×d while sliding the diagonal elements of the diagonal-line portion shown in FIG. 4.

Prior to the update, c is multiplied by the reciprocal of the diagonal element.

Consider that the diagonal element after the update is the reciprocal of the original diagonal element. The character d is considered to be obtained by multiplying each column element by a diagonal element before update, and then multiplying the result by −1.

As a result, the information about the lower triangular matrix required to update the portion on the left of B and H.

Figure 5:
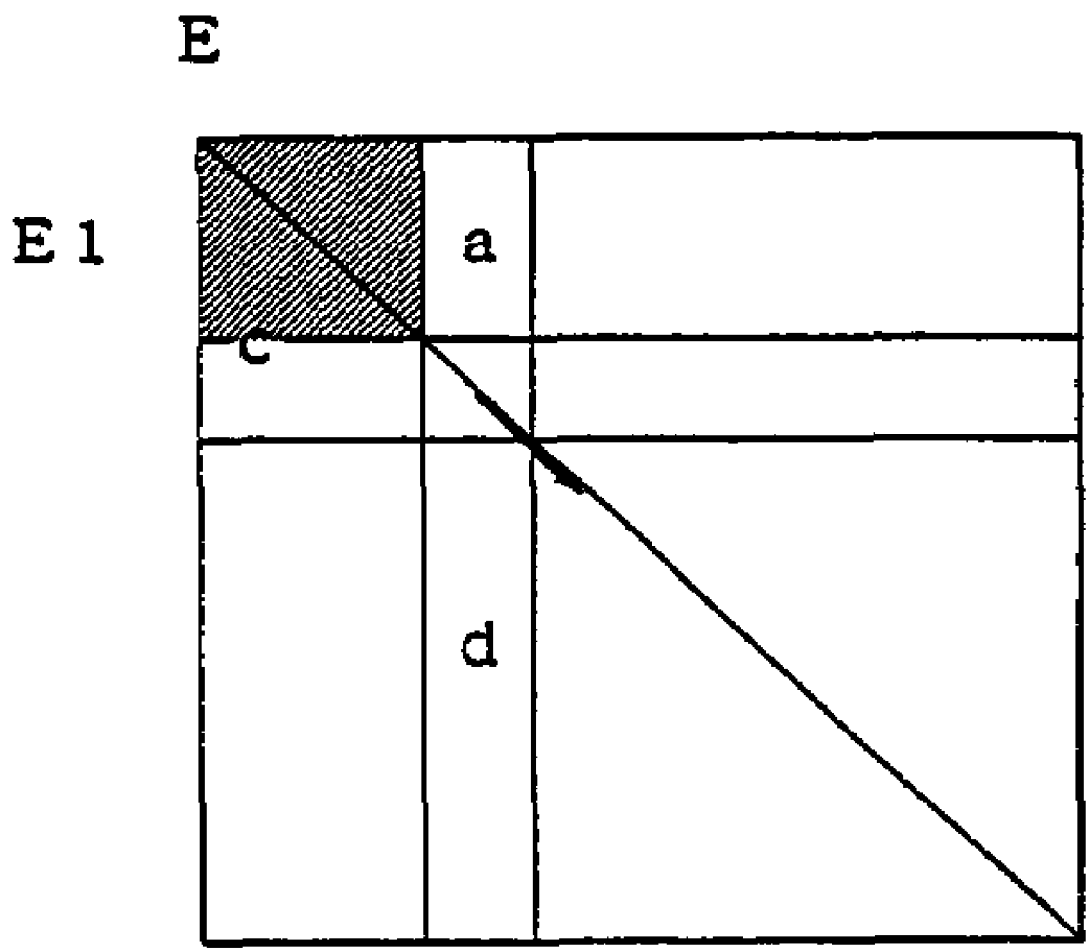
FIG. 5 is a diagram (4) showing the order of computation according to an embodiment of the present invention.

In 9) above, the updating process is performed by E1=E1−a×c while sliding the diagonal element of the diagonal-line portion shown in FIG. 5.

The 'a' after the update is considered to be obtained by multiplying the column element of a by the original diagonal element, and then by −1.

D) Details of the Parallelism for the Shared Memory Type Scalar Computer

0) The LU decomposition on E, F, H, and I is a parallel decomposition using the parallel algorithm of the LU decomposition.
1) Control of block width An embodiment of the present invention is provided with a system of adjusting a block width depending on the scale of a problem and the number of processors used in the parallelism.

Since the block E is updated by one processor, the block width is determined to be ignored (about 1%) with consideration given to the total cost of the portion.

2) In the update in C 4) above, the updating processes by the respective matrix products are performed in parallel. Each processor equally divides the second dimension for parallel sharing in computation.
3) In the update in C 5), that is, the update of D and F is performed by each processor updating in parallel the areas obtained by equally dividing the second dimension of D and F.
4) The update in C 8) above is performed in parallel by each processor by sharing the areas obtained by equally dividing the first dimension of H.
5) Finally, the interchanging process on column vectors is performed in parallel by equally dividing the first dimension of the entire matrix into areas.

Figure 6:
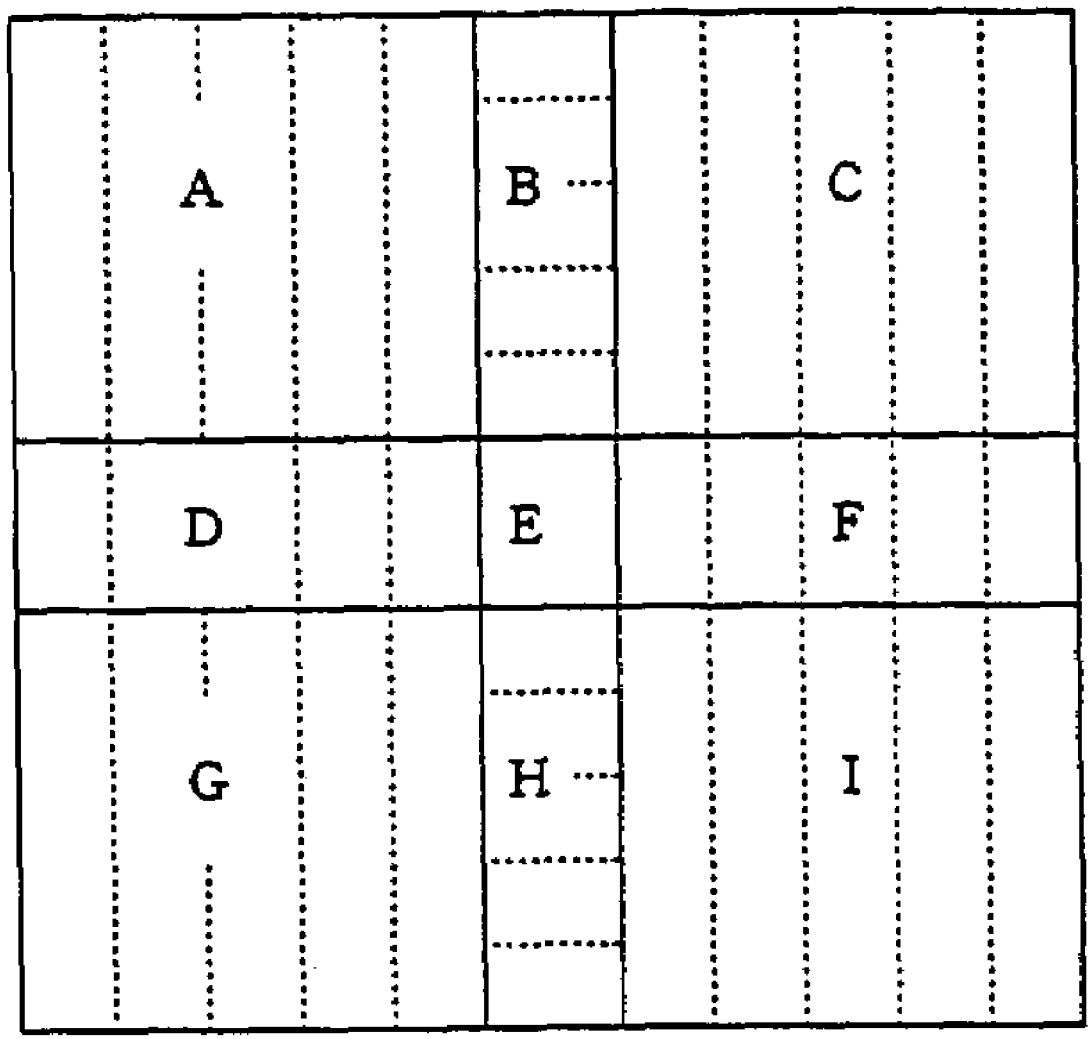
FIG. 6 is a diagram (5) showing the order of computation according to an embodiment of the present invention.

The broken lines shown in FIG. 6 show an example of dividing an area in updating matrix portion in parallel.

Access to Memory in Updating B or H

Described below is the case in which the recursive program operates up to the depth of 2.

FIGS. 7A, and 7B, 7C, and 7D, 7E, and 7F each is a set.

First updated is the diagonal-line portion shown in FIG. 7A. At this time, the diagonal-line portion and the dotted line triangular portion are used.

Refer to the pseudo code for details. Next, the diagonal-line portion shown in FIG. 7A is updated using the horizontal-line portion shown in FIG. 7A and the rectangular diagonal-line portion shown in FIG. 7B. Then, the horizontal-line portion shown in FIG. 7A is updated using the triangular portion in bold lines.

Next, the diagonal-line portion shown in FIG. 7C is updated by the product of the right white-painted rectangle shown in FIG. 7C and the rectangle in bold lines shown in FIG. 7D.

Then, the diagonal-line portion shown in FIG. 7E is updated using the triangular portion in broken lines shown in FIG. 7F. Furthermore, the diagonal-line portion shown in FIG. 7E is updated by the product of the horizontal-line portion shown in FIG. 7E and the rectangle with diagonal lines shown in FIG. 7F. Finally, the horizontal-line portion is updated using the triangular portion in bold lines shown in FIG. 7F.

In the above mentioned procedure, reference to E is common. Therefore, E can be stored in the cache of each processor for reference. In addition, for example, reference to and update to B is processed in parallel on the areas in the row direction (areas obtained by dividing by bold broken lines).

Memory Access in Updating D or F

Described below is the case in which the recursive program operates up to the depth of 2.

First updated is the left diagonal-line portion shown in FIG. 8A. At this time, the diagonal-line portion and the right triangular portion in broken lines shown in FIG. 8A are used.

Refer to the pseudo code for details. Then, the left diagonal-line portion shown in FIG. 8A is updated using the right rectangular portion with diagonal lines shown in FIG. 8A and the left vertical-line portion shown in FIG. 8A. Then, the left horizontal-line portion shown in FIG. 8A is updated using the right triangular portion in bold lines shown in FIG. 8A.

Next, the left diagonal-line portion shown in FIG. 8B is updated by the product of the right rectangle in bold lines shown in FIG. 8B and the left white painted rectangle shown in FIG. 8B.

Then, the left diagonal-line portion shown in FIG. 8C is updated using the right triangular portion in broken lines shown in FIG. 8C. The left diagonal-line portion shown in FIG. 8C is updated using the product of the right rectangle with diagonal lines shown in FIG. 8C and the left vertical-line portion shown in FIG. 8C. Finally, the left vertical-line portion shown in FIG. 8C is updated using the right triangular portion in bold lines shown in FIG. 8C.

In the above mentioned procedure, reference to E is common. Therefore, E can be stored in the cache of each processor for reference. Furthermore, the reference to and update of D is processed in parallel on the areas in the row direction (areas obtained by dividing by bold broken lines).

FIGS. 9 through 15 show the pseudo code according to an embodiment of the present invention.

FIG. 9 shows the pseudo code of the main algorithm of the parallelism algorithm of an inverse matrix. In the following pseudo code, the row having C at the left end is a comment row. 'array a(k,n)' is an array storing the elements of the matrix whose inverse matrix is to be obtained. 'ip (n)' is an array storing the information used in interchanging rows in the LU decomposition subroutine. For the algorithm of the LU decomposition subroutine, refer to Japanese Patent Application Laid-open No.Hei-12-358232. 'nb' refers to the number of blocks specified when the LU decomposition is performed.

When the LU decomposition is completed on one specified block, and if ip(i) is larger than i, then the i-th row of the matrix is interchanged with the ip(i)th row. Then, the update subroutine is called, and the matrix is updated. The processes from the LU decomposition to the update subroutine are repeatedly performed until the processes are performed on all specified blocks. For the final specified block, another LU decomposition and update are performed, thereby terminating the process.

FIG. 10 shows the pseudo code for updating the remaining portions according to the information about the LU decomposition.

In the update routine shown in FIG. 10, the updating process is performed on each of the blocks A through H. For the blocks A through D and G, an exclusive subroutine is further read. Since the block I has already been updated when the LU decomposition is carried out, the subroutine is not further prepared here.

When the update routine terminates for the blocks A through D and G, the barrier synchronization is attained. Then, if the number of the processor (thread number) is 1, then the 'update 1 of e' is performed. This process is performed by the e-update1 subroutine. After the process, the barrier synchronization is attained.

'len' indicates the width of a block to be processed in one thread. 'is' indicates the first position of the block to be processed, and 'ie' is the last location of the block to be processed. 'df-update' indicates the subroutine for updating the blocks D and F. If the blocks D and F have been updated, then the first position of a block with a block width added is stored as the first position (nbase2) of a new block, 'len' is newly computed, the first and last positions of the blocks 'is2' and 'ie2' is newly computed, and D and F are updated by df-update, thereby attaining the barrier synchronization.

Additionally, as for 'update 2 of e', when the thread number is 1, the update subroutine e-update2 of the block E is called for and barrier synchronization is performed. Similarly, as described above, 'len', 'is', and 'ie' are computed, the update routine bh-update is called for the blocks B and H, 'nbase2' is obtained, 'len', 'is2', and 'ie2' are obtained, and the process is performed by bh-update again, thereby attaining the barrier synchronization.

Furthermore, when the thread number is 1, the process is performed by u-update3 as 'update 3 of e', thereby attaining the barrier synchronization.

Afterwards, to restore the state of interchanged pivots to the original state, 'len', 'is', and 'ie' are computed, then columns are interchanged by the subroutine 'exchange', the barrier synchronization is attained, and the thread is deleted, thereby terminating the process.

FIG. 11 shows the pseudo code of the update subroutine of the blocks B and D.

In updating the block B, the subroutine b-update accesses a shared matrix a(k,n), and 'len', 'is1', and 'ie1' having the same meanings as the explanation above are computed. 'iof' indicates the number of the starting column of the block B. Then, using the matrix TRU-U having the diagonal element of the upper triangular matrix set to 1, the block B of the array a is updated by the equation shown in FIG. 11. The expression 'is:ie' indicates the process from the matrix element 'is' to 'ie'.

In updating the block D, the subroutine d-update computes a similar parameter, and updates the matrix a by the equation shown in FIG. 11 according to the lower triangular matrix TRL in the block E.

FIG. 12 shows the pseudo code of the update subroutine for the blocks C and A.

In the update subroutine c-update for the block C, the block C is updated by the multiplication of the blocks B and F. a (1:iof, is2:ie2) indicates the block C, a (1:iof, iof+1:iof+blk) indicates the block B, a (iof+1:iof+blk, is2:ie2) indicates the block F.

In the update subroutine a-update of the block A, the block A is updated using the blocks B and D. a (1:iof, is2:ie2) indicates the block A, a (1:iof, iof+1:iof+blk) indicates the block B, a (iof+1:iof+blk, is2:ie2) indicates the block D.

FIG. 13 shows the pseudo code indicating the first and second update of the blocks G and E.

In the update subroutine a-update of the block G, as in the above mentioned subroutines, 'len', 'is2', 'ie2', 'iof', etc. indicating the width, the starting position, the ending position, etc. of a block are computed, and the block G is updated using the blocks D and H. a (iof+1:n, is2:ie 2) indicates the block G, a (iof+1:n, iof+1:iof+blk) indicates the block H, and a (oif+1:iof+blk, is2:ie2) indicates the block D.

In the first update subroutine e-update1 of the block E, the triangular matrix above the diagonal elements of E is updated using the column vector s (1:i, i) before the diagonal elements and the row vector (i, i+1:blk) after the diagonal elements.

In the second update subroutine e-update2 of the block E, the diagonal element of the upper triangular matrix of the block E is updated into the value obtained by dividing the element value before the update by the diagonal element value, updated using the row vector s (i, 1:i−1) before the diagonal element and the column vector s (i+1:blk, i) after the diagonal element, updated into the value obtained by dividing the element value of the lower triangular matrix of the block E by the value obtained by changing the sign of the diagonal element, and the diagonal element is updated into the reciprocal of the diagonal element of the block E.

FIG. 14 shows the pseudo code of the final update for the block E, and the update subroutine for the blocks D and F.

In the final update subroutine e-update3 of the block E, the upper triangular matrix of the block E is updated by the column vector s (1:i−1, i) before the diagonal element and the row vector s (i, 1:i−1), and is updated by multiplying the element before the diagonal element of the block E by the diagonal element before update.

In the update subroutine df-update for the blocks D and F, if the width len of a block is smaller than 10, the block D or F (depending on the argument 'is' or 'ie' of the subroutine) is updated by the element value s (1:i−1, i) and its own row vector a (i, is:ie). The element value of the block D or F is expressed by a (1:i−1, is:ie) so that when the subroutine reads a matrix element, a read position is offset by the above mentioned nbase, thereby studying the block D or F by computing a column number for the element values 1~i−1. When 'len' is 20 or larger and 32 or smaller, len1 and len2 are defined, df-update id recursively called, the process shown in FIG. 14 is performed, and df-update is further called, thereby terminating the process.

FIG. 15 shows the pseudo code of the update subroutine of the blocks B and H.

In FIG. 15, bh-update performs the updating process by the operation shown in FIG. 15 when 'len' is smaller than 10. If 'len' is 20 or larger and 32 or smaller, then len1 and len2 are defined. Otherwise, len1 and len2 are separately defined, bh-update is called, the operation is performed by the equation shown in FIG. 15, and bh-update is further called, thereby terminating the process.

According to an embodiment of the present invention, for the same function (another method of obtaining an inverse matrix after the LU decomposition), as compared with the function of the numeric operation library SUN Performance library of SUN, the process can be performed using 7 CPUs at a speed 6.6 times higher.

FIGS. 16 through 29 are flowcharts of the processes of pseudo codes.

FIG. 16 shows the main process. First, the arithmetic of the inverse matrix starts with the input of the subroutine shared array A(k, n). In step S10, a thread is generated, and a total number of threads is set in the local area numthr for each thread, and a thread number assigned to each thread is set in nothrd. Additionally, for each thread, the block width is set in iblk, nb=(n+iblk−1)/iblk is set, and i=1 is set. In step S11, it is determined whether or not i equal to nb−1. If the determination in step S11 is YES, control is passed to step S17. If the determination in step S11 is NO, nbase is set to (i−1)×iblk in step S12, A(nbase+1:n, nbase+1:nbase+n) is LU-decomposed by block width iblk, and a row block and a lower right square matrix are updated in step S13. At this time, ip(nbase+1:nbase+iblk) contains the information for exchange of rows, which is set as a subroutine. The parallel algorithm of this portion is described in the patent application previously filed by the applicant the present invention. In step S14, the subroutine exchgrow is called, and row vectors are exchanged in A(nbase+1:nbase+iblk, 1:nbase). That is, j is changed from nbase+1 to nbase+iblk, and A(j, 1:nbase) is exchanged for A(ip(j), 1:nbase) when ip (j)>j is satisfied. In step S15, the subroutine update is called to update another block. In step S16, i=i+1 is set, and control is returned to step S11. In step S17, nbase=(nb−1)×iblks is computed. In step S18, the LU-decomposition is performed on A(nbase+1:n, nbase+1:n). The information about the exchange of rows is contained in ip(nbase+1:n−1) . In step S19, the subroutine exchgrow is called, and the row vectors in A(nbase+1:n−1, 1:nbase) are exchanged. In step S20, the subroutine update is called for update. In step S21, the subroutine exchgcol is called to exchange row vectors. That is, j is changed from n sequentially by 1. When jp(j)>j is satisfied, A(1:n,j) is exchanged for A(1:n, ip(j)). In step S22, the thread generated for parallel process is deleted.

Figure 17:
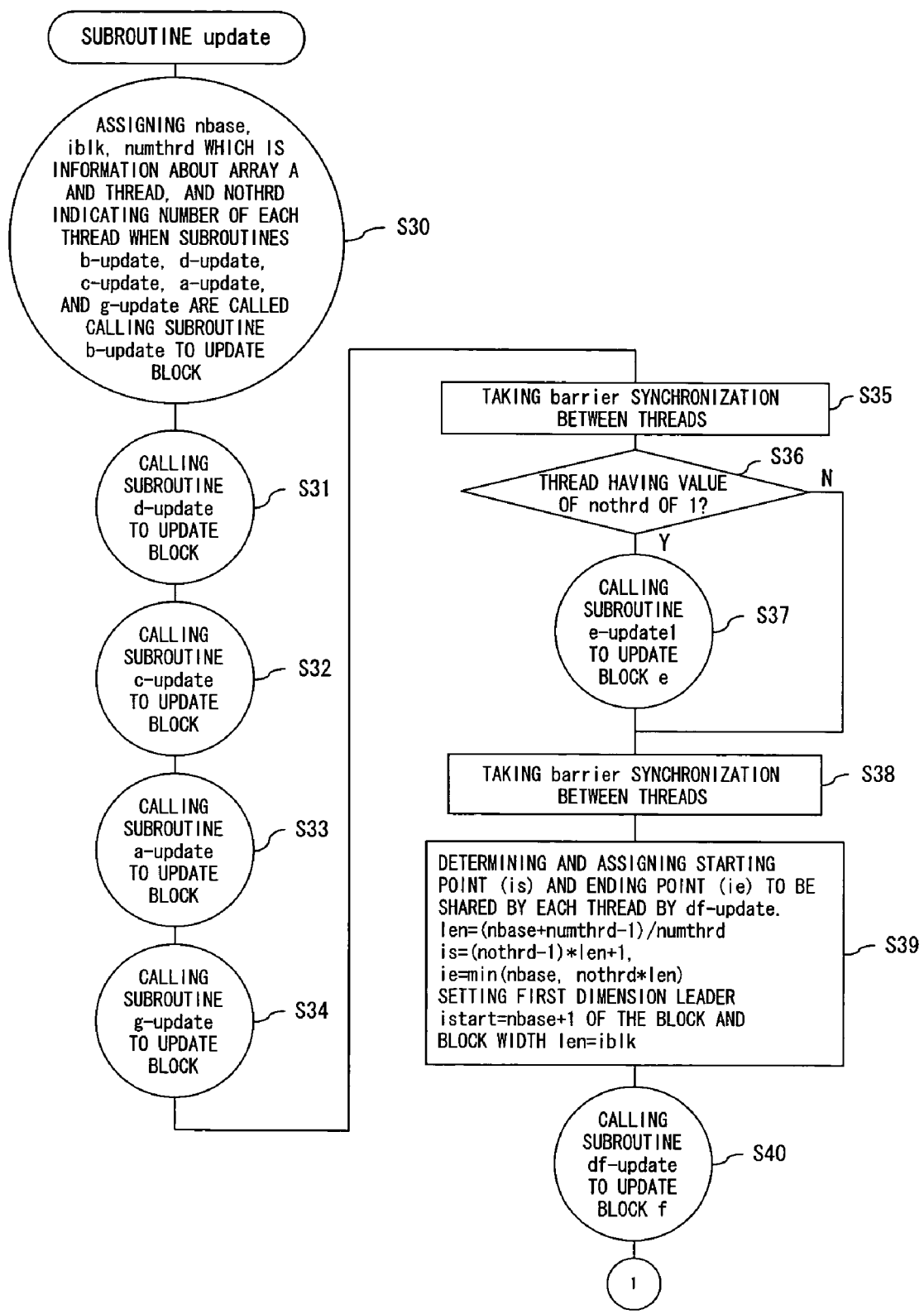
FIG. 17 is a flowchart (2) of the process of the pseudo code.
Figure 18:
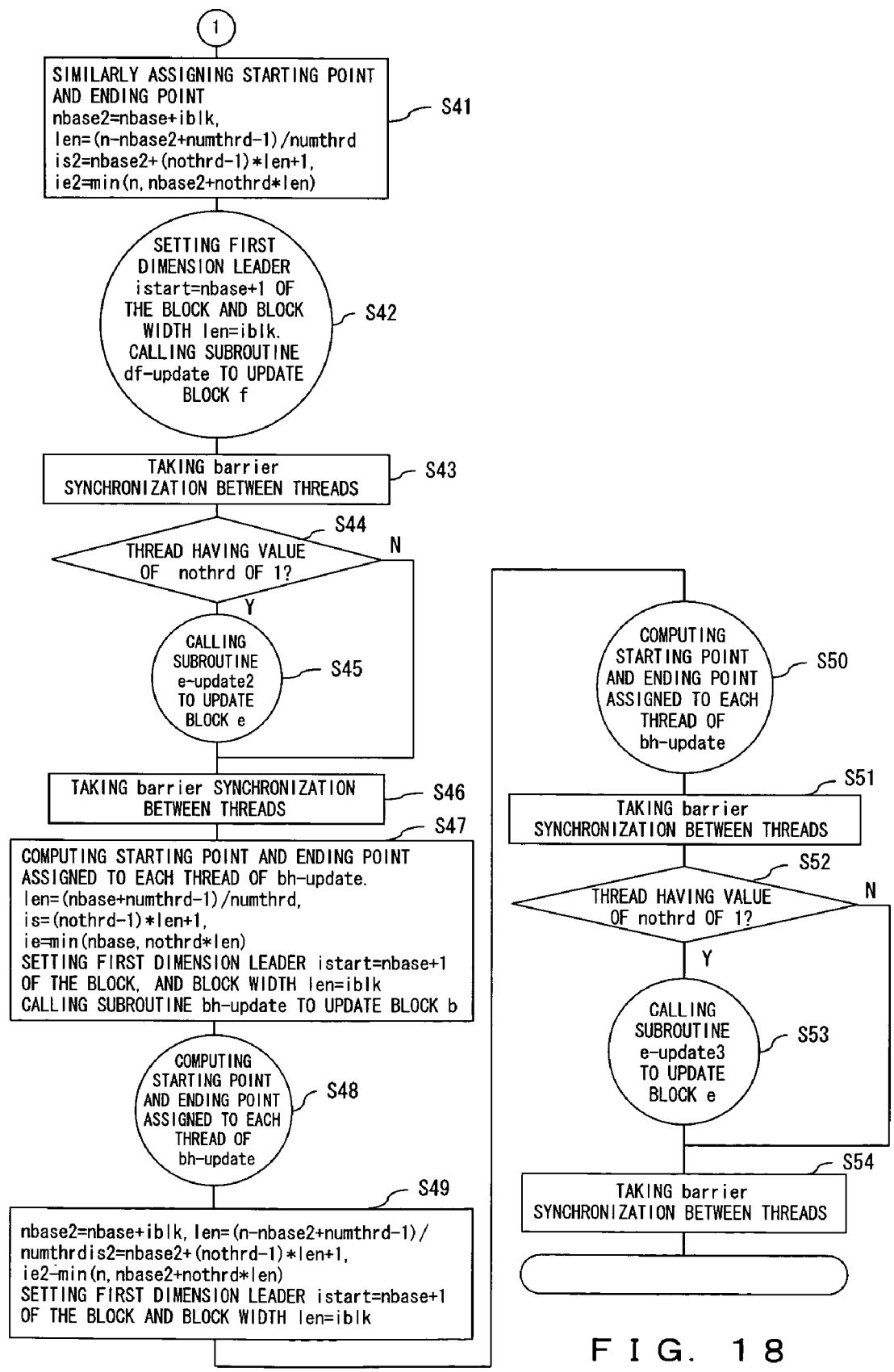
FIG. 18 is a flowchart (3) of the process of the pseudo code.

FIGS. 17 and 18 are flowcharts of the subroutine update.

In step S 30, when the subroutines b-update, d-update, c-update, a-update, and g-update are called, nbase, iblk, numthrd which is the information about the array A and the threshold, and nothrd which refers to a thread number are assigned. The subroutine b-update is called to update the block. In step S31, the subroutine d-update is called to update the block. In step S32, the subroutine c-update is called to update the block. In step S33, the subroutine a-update is called to update the block. In step S34, the subroutine g-update is called to update the block.

In step S35, the barrier synchronization is taken between threads. In step S36, it is determined whether or not the thread has the value of nothrd of 1. If the determination in step S36 is NO, control is passed to step S38. If the determination in step S36 is YES, then the subroutine e-update is called to update the block e in step S37, and control is passed to step S38. In step S38, barrier synchronization is taken between threads. In step S39, the df-update determines and assigns the starting point (is) and the ending point (ie) to be shared by each thread. Len=(nbase+numthrd−1)/numthrd, is=(nothrd−1)×len+1, ie=min(nbase,nothrd×len) are computed. The first dimension leader of the block is set as istart=nbase+1, and the block width is set as len=iblk. In step S40, the subroutine df-update is called to update the block f.

In step S41, the starting point and the ending point is similarly computed and assigned. Nbase2=nbase+iblk, len=(n−nbase2+numthrd−1)/numthrd, is2=nbase2+(nothrd−1)×len+1, ie2=min(n,nbase2+nothrd×len) are computed. In step S42, the first dimension leader of the block is set as istart=nbase+1, and the block width is set as len=iblk. The subroutine df-update is called to update the block f. In step S43, barrier synchronization is taken between threads. It is determined in step S44 whether or not the thread has the value of nothrd of 1. If the determination in step S44 is NO, control is passed to step S46. If the determination in step S44 is YES, then the subroutine e-update2 is called to update the block e in step S45, and control is passed to step S46. In step S46, barrier synchronization is taken between threads. In step S47, the starting point and the ending point to be assigned to each thread of the bh-update are computed. That is, len=(nbase+numthrd−1)/numthrd, is=(nothrd−1)×len+1,ie=min(nbase, nothrd×len) are computed. The first dimension leader of the block is set as istart=nbase+1, and the block width is set as len=iblk. The subroutine bh-update is called to update the block b. In step S48, the starting point and the ending point to be assigned to each thread of the bh-update are computed.

In step S49, nbase2=nbase+iblk, len=(n−nbase2+numthrd−1)/numthrd, is2=nbase2+(nothrd−1)×len+1, ie2=min(n,nbase2+nothrd×nothrd×len) are computed, the first dimension leader of the block is set as istart=nbase+1, and the block width is set as len=iblk. In step S50, the starting point and the ending point to be assigned to each thread of the bh-update are computed. In step S51, barrier synchronization is taken between threads. In step S52, it is determined whether or not the thread has the value of nothrd of 1. If the determination in step S52 is NO, control is passed to step S54. If the determination is YES, then the subroutine e-update3 is called to update the block e in step S53, and control is passed to step S54. In step S54, barrier synchronization is taken between threads.

FIG. 19 is a flowchart of the processes of the subroutines b-update and d-update.

In the subroutine b-update, in step S60, the starting point and the ending point of the first dimension shared by each thread are computed. That is, len=(nbase+numthrd−1)/numthrd, is1=(nothrd−1)×len+1, ie1=min(nbase,nothrd×len), iof=nbase are computed. In step S61, A (is1:ie1,iof+1:iof+iblk)=A (is1:ie1,iof+1:iof+iblk)×TRU-U (A(iof+1:iof+iblk,iof+1:iof+iblk))$^{-1}$ is computed. TRU-U is an upper triangular matrix having the diagonal element of 1.0. Then, the subroutine exits.

In the subroutine d-update, in step S65, the starting point and the ending point to be shared by each thread are computed. That is, len=(nbase+numthrd−1)/numthrd, is1=(nothrd−1)×len+1, ie1=min(nbase,nothrd×len), iof=nbase are computed. In step S66, A (iof+1:iof+iblk,is1:ie1)=TRL (A (iof+1:iof+iblk,iof+1:iof+iblk))$^{-1}$×A (iof+1:iof+iblk,is1:ie1) is computed. The TRL refers to a lower triangular matrix of the square matrix. Then, the subroutine exits.

Figure 20:
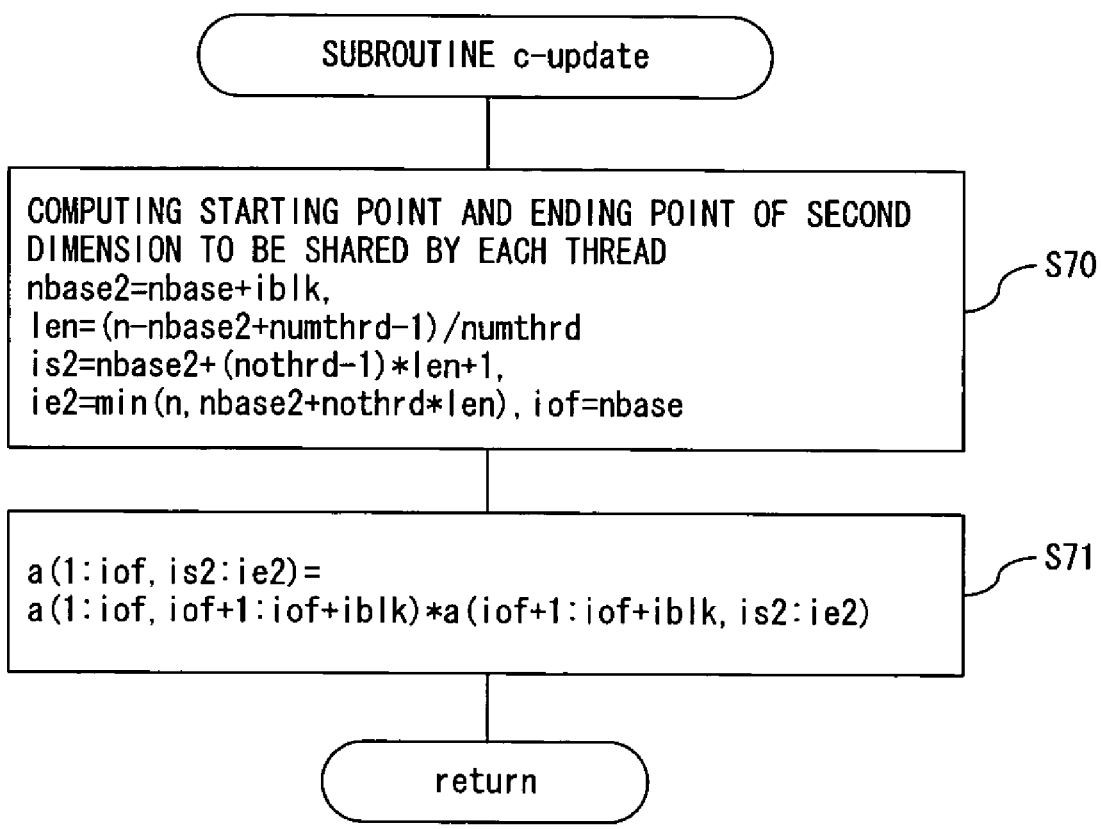
FIG. 20 is a flowchart (5) of the process of the pseudo code.

FIG. 20 is a flowchart of the subroutine c-update.

In step S70, the starting point and the ending point of the second dimension shared by each thread are computed. That is, nbase2=nbase+iblk, len=(n−nbase2+numthrd−1)/numthrd, is2=nbase2+(nothrd−1)×len+1, ie2=min(n, nbase2+nothrd×len), iof=nbase are computed. In step S71, A(1:iof,is1:ie2)=A(1:iof,iof+1:iof+ilbk)×A(iof+1:iof+ilbk, is2:ie2) is computed. Then, the subroutine exits.

Figure 21:
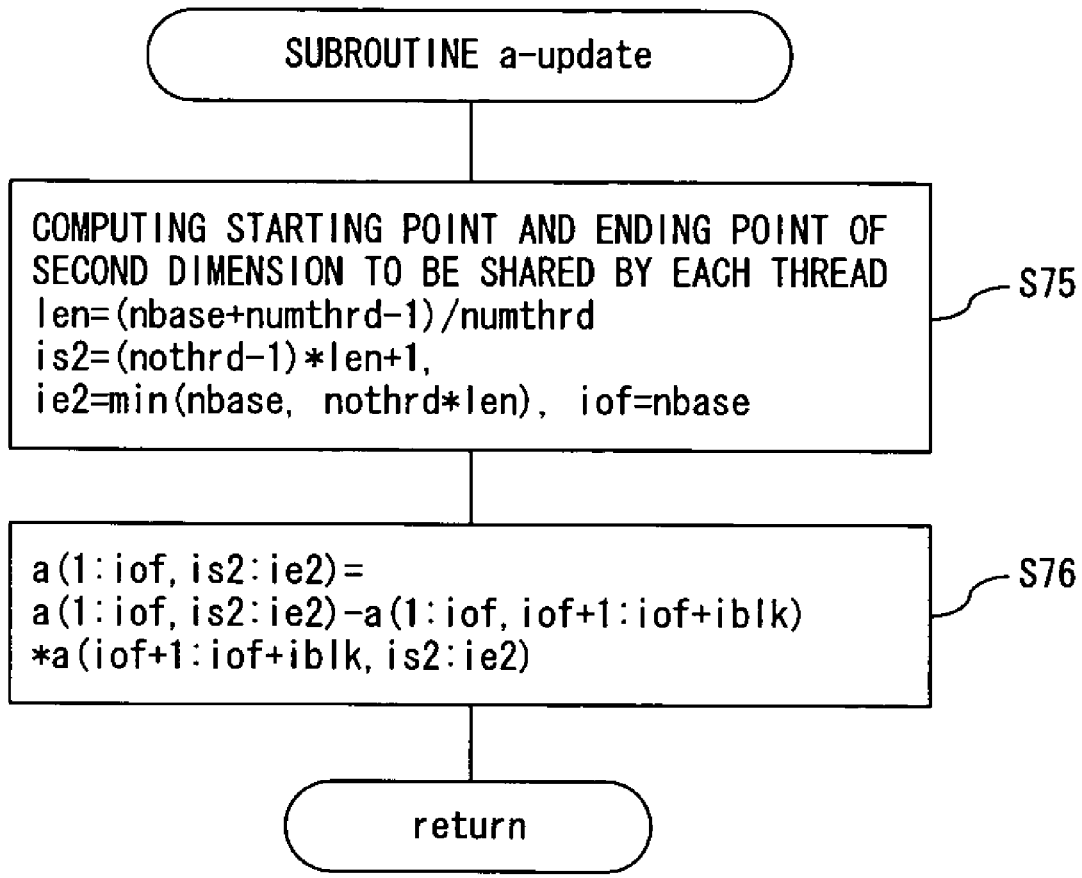
FIG. 21 is a flowchart (6) of the process of the pseudo code.

FIG. 21 is a flowchart of the subroutine a-update.

In step S75, the starting point and the ending point of the second dimension shared by each thread are computed. That is, len=(nbase+numthrd−1)/numthrd, is2=(nothrd−1)×len+1, ie2=min(nbase,nothrd×len), iof=nbase are computed.

In step S76, A (1:iof,is2:ie2)=A (1:iof,is2:ie2)−A(1:iof, iof+1:iof+iblk)×A(iof+1:iof+iblk,is2:ie2) is computed. Then, the subroutine exits.

Figure 22:
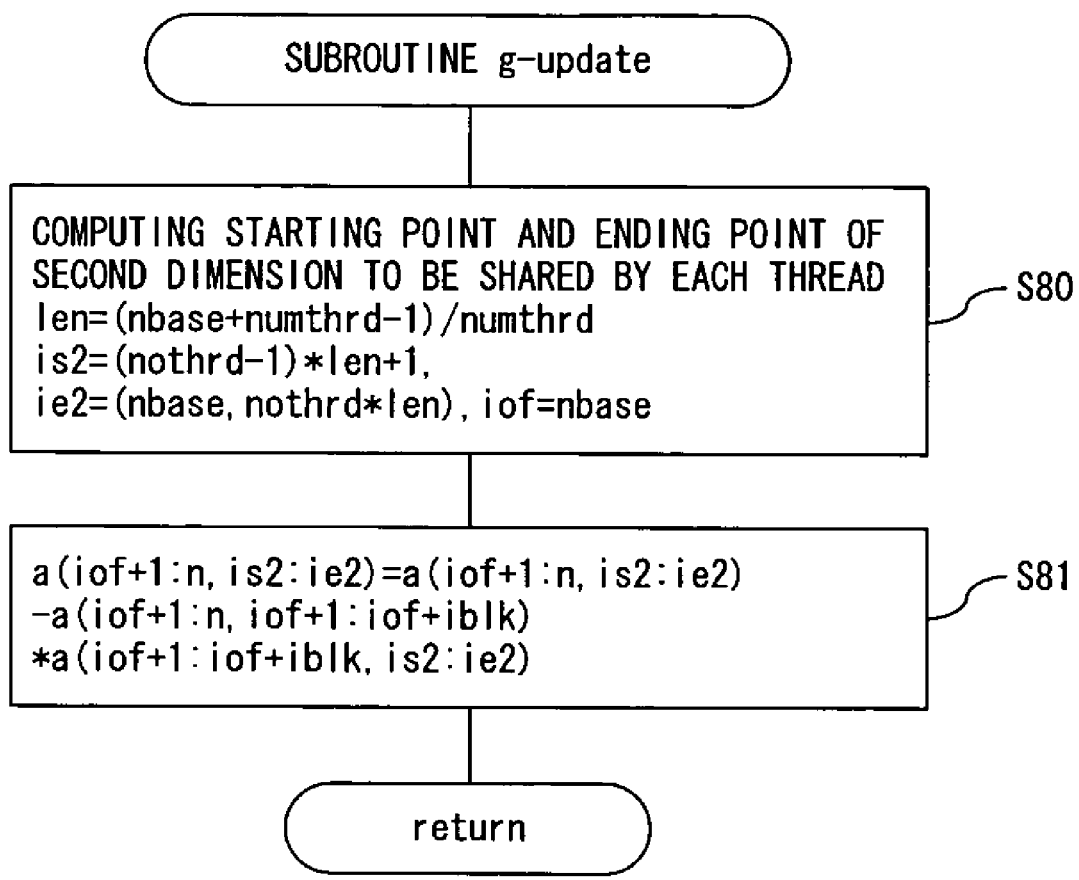
FIG. 22 is a flowchart (7) of the process of the pseudo code.

FIG. 22 is a flowchart of the subroutine g-update.

In step S80, the starting point and the ending point of the second dimension shared by each thread are computed. That is, len=(nbase+numthrd−1)/numthrd, is2=(nothrd−1)×len+1, ie2=min(nbase,nothrd×len), iof=nbase are computed. In step S81, A (iof+1:n,is2:ie2)=A (iof+1:n,is2:ie2)−A (iof+1:n,iof+1:iof+iblk)× A (iof+1:iof+iblk,is2:ie2). Then, the subroutine exits.

Figure 23:
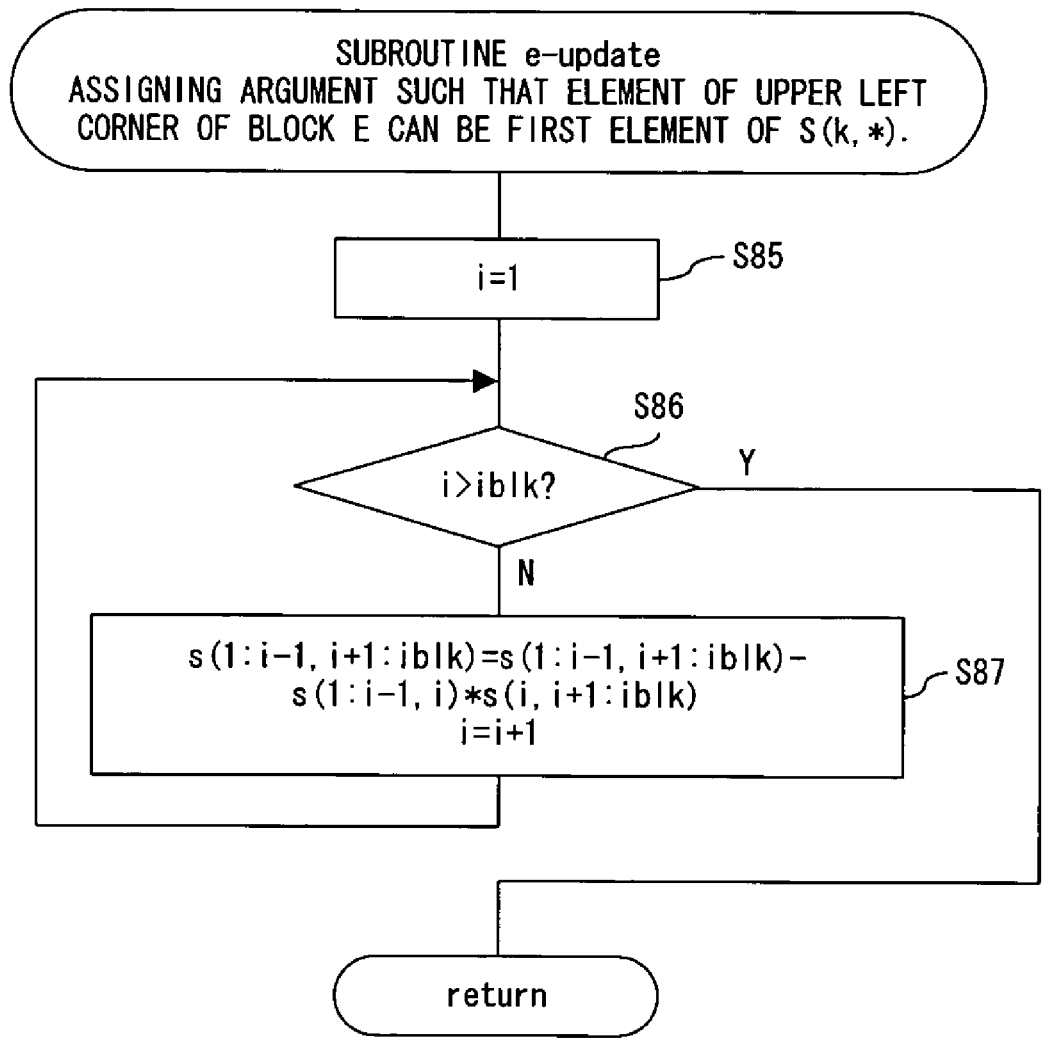
FIG. 23 is a flowchart (8) of the process of the pseudo code.

FIG. 23 is a flowchart of the subroutine e-update.

In this routine, the argument is assigned such that the element of the upper left corner of the block E can be the first element of S (k, *). In step S85, i=1 is set. In step S86, it is determined whether or not i>iblk. If the determination in step S86 is YES, the subroutine exits. If the determination in step S86 is YES, s(1:i−1,i+1:iblk)=s(1:i−1,i+1:iblk)−s(1:i−1,i)×s (i,i+1:iblk), i=i+1 are computed in step S87 and the subroutine exits.

Figure 24:
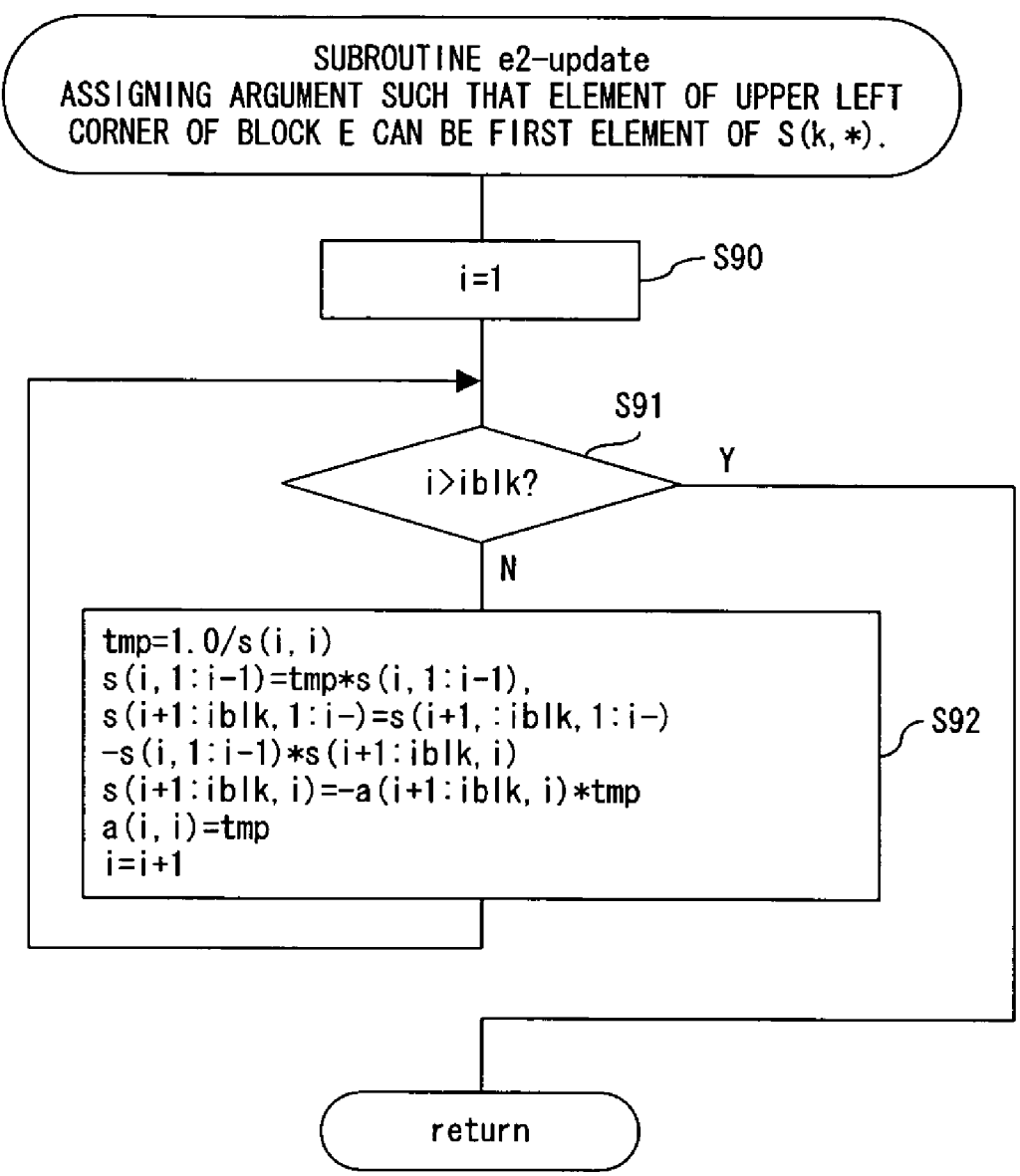
FIG. 24 is a flowchart (9) of the process of the pseudo code.

FIG. 24 is a flowchart of the subroutine e2 -update.

First, the argument is assigned such that the element of the upper left corner of the block E can be the first element of S (k, *). In step S90, i=1 is set. In step S91, it is determined whether or not i>iblk. If the determination in step S91 is YES, the subroutine exits. If the determination in step S91 is NO, tmp=1.0/S(i,i), S(i,i:i−1)=tmp×S(i,1:i−1), S(i+1:iblk,1:i−1)= S(i+1:iblk,1:i−1)−S(i,1:i−1)×S(i+1:iblk,i), S(i+1:iblk,i)=−A (i+1,iblk,i)×tmp, A(i,i)=tmp, i=i+1 is computed in step S92, and control is returned to step S91.

Figure 25:
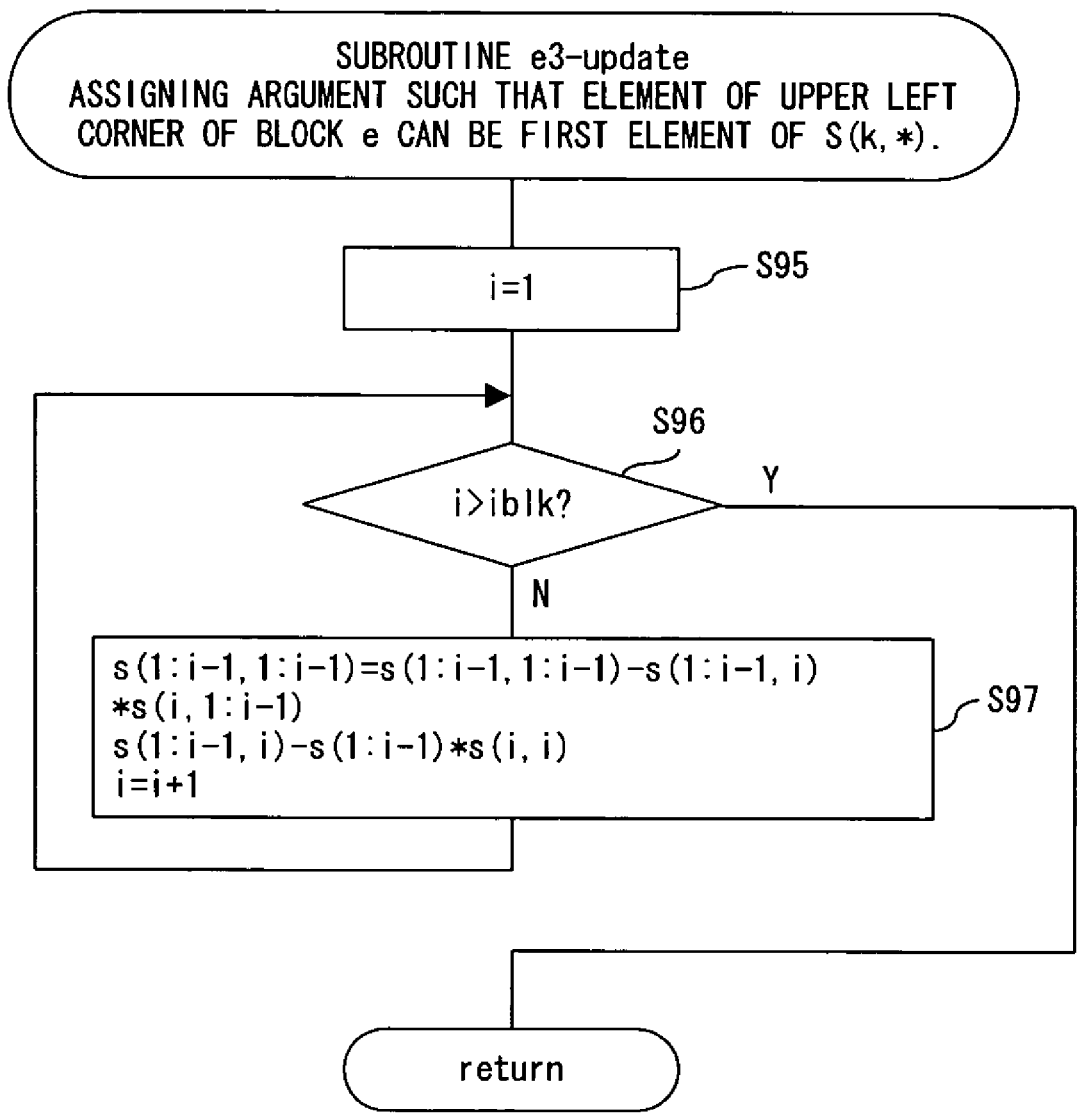
FIG. 25 is a flowchart (10) of the process of the pseudo code.

FIG. 25 is a flowchart of the subroutine e3 -update.

First, the argument is assigned such that the element of the upper left corner of the block E can be the first element of S (k, *). In step S95, i=1 is set. In step S96, it is determined whether or not i>iblk. If the determination in step S96 is YES, the subroutine exits. If the determination in step S96 is NO, S(1:i−1,1:i−1)=S(1:i−1,1:i−1)−S(1:i−1,i)×S(i,1:i−1), S(1:i−1,i)=S(1:i−1)×S(i,i), i=i+1 are computed in step S97, and control is returned to step S96.

Figure 26:
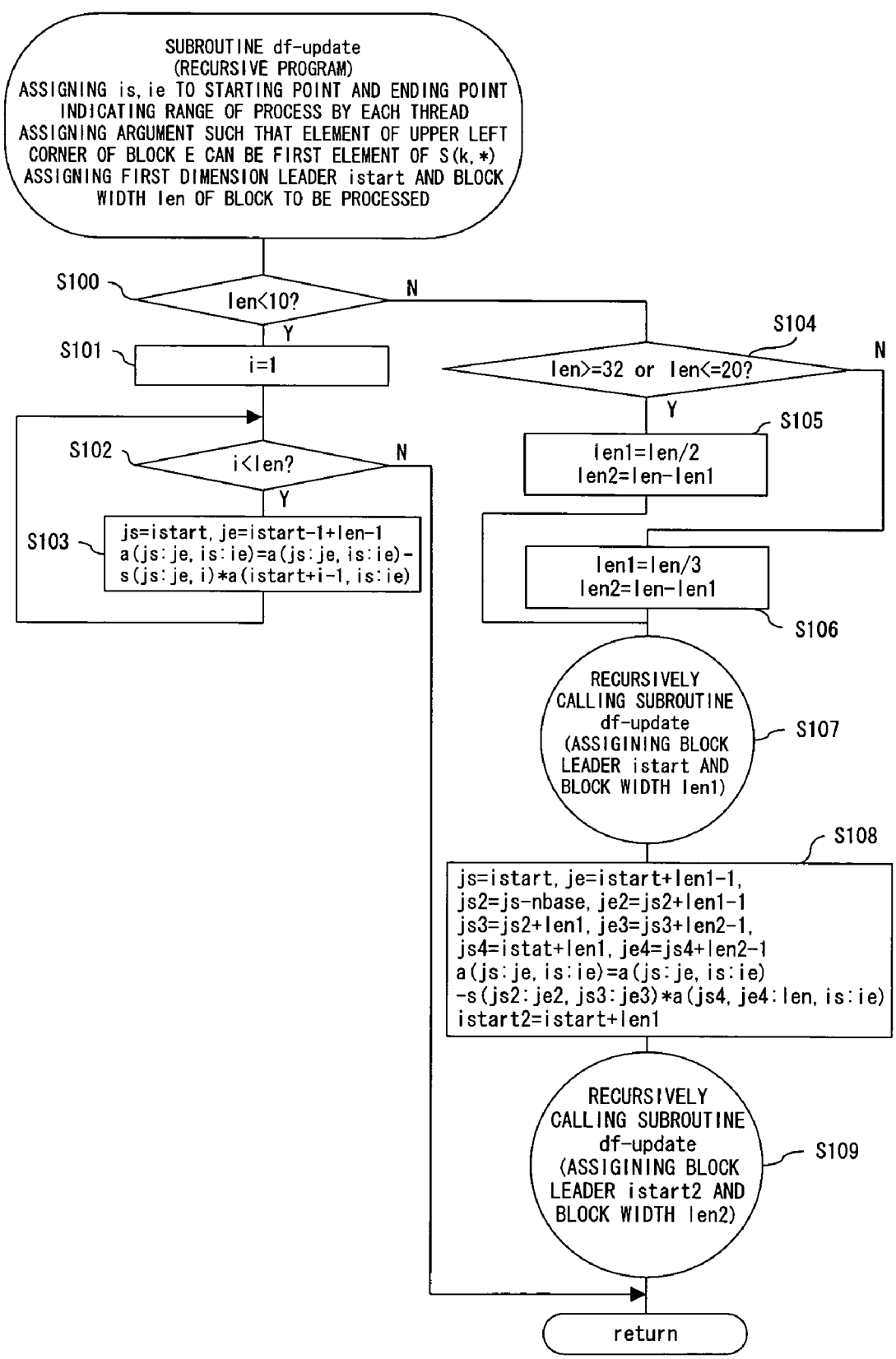
FIG. 26 is a flowchart (11) of the process of the pseudo code.

FIG. 26 is a flowchart of the subroutine df-update.

The subroutine is a recursive program. First, is and ie are assigned to the starting point and the ending point indicating the range of the process in each thread. The argument is assigned such that the element of the upper left corner of the block E can be the first element of S (k, *). The first dimension leader istart of the block to be processed and the block width len are assigned. In step S100, it is determined whether or not len<10 is held. If the determination in step S100 is NO, control is passed to step S104. If the determination in step S100 is YES, then i=1 is set in step S101, and it is determined in step S102 whether or not 1<=len is held. If the determination in step S102 is NO, the subroutine exits. If the determination in step S102 is YES, then js=istart, je=istart−1+len−1, A (js:je,is,ie)=A (js:je,is,ie)−S (js:je,i)×A (istart+i−1,is:ie) are computed in step S103, and control is returned to step S102.

In step S104, it is determined which is held, len>=32 or len<=20. If the determination in step S104 is NO, then len1=len/3, len2=len−len1 are set, and control is passed to step S107. If the determination in step S104 is YES, then len1=len/2, len2=len−len1 are set in step S105, and control is passed to step S107. In step S107, the subroutine bf-update is recursively called (the block leader istart and the block width len1 are assigned). In step S108, js=istart, je=istart+len1−1, js2=js−nbase, je2=js2+len1−1, js3=js2+len1, je3=js3+len2−1, js4=istart+len1, je4=js4+len2−1, A(js:je,is:ie)=A(js:je,is:ie)−S(js2:je2,js3:je3)×A(js4,je4:len,is:ie), istart2=istart+len1 are computed, and control is passed to step S109. In step S109, the subroutine df-update is recursively called (the block leader istart2 and the block width len2 are assigned), and the subroutine exits.

Figure 27:
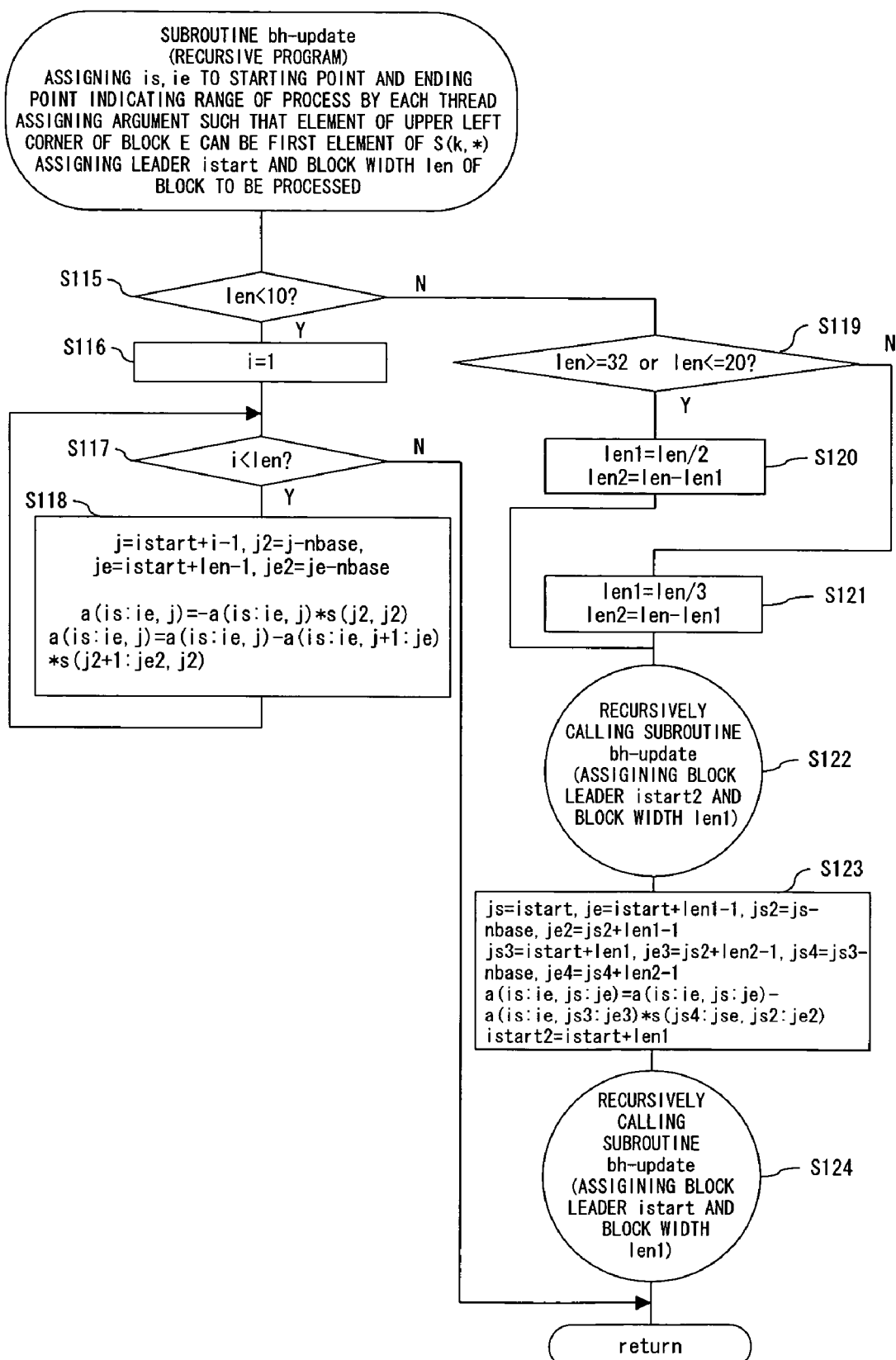
FIG. 27 is a flowchart (12) of the process of the pseudo code.

FIG. 27 is a flowchart of the subroutine bh-update.

The subroutine is a recursive program. First, is and ie are assigned to the starting point and the ending point indicating the range of the process in each thread. The argument is assigned such that the element of the upper left corner of the block E can be the first element of S (k, *). The first dimension leader istart of the block to be processed and the block width len are assigned. In step S105, it is determined whether or not len<10 can be held. If the determination in step S115 is NO, then control is passed to step S119. If the determination in step S115 is YES, then i=1 is set in step S116, and it is determined in step S117 whether or not i<=len is held. If the determination in step S117 is NO, then the subroutine exits. If the determination in step S117 is YES, then j=istart+i−1, j2=j−nbase, je=istart+len−1, je2=je−nbase, A (is:ie,j)=−A (is:ie,j)×S(j2,j2), A (is:ie,j)=A (is:ie,j)−A (is:ie,j+1:je)×S (j2+1:je2,j2) are computed in step S18, and control is passed to step S117.

In step S119, it is determined which is held len>=32 or len<=20. If the determination in step S119 is NO, control is passed to step S121. If the determination is YES, control is passed to step S120. In step S120, len1=len/3, len2=len−len1 are computed, and control is passed to step S122. In step S121, len1=len/3, len2=len−len1 are computed, and control is passed to step S122. In step S122, the subroutine bh-update is recursively called, the target block leader istart and the block width len1 are assigned. In step S123, js=istart, je=istart+len1−1, js2=js−nbase, je2=js2+len1−1, js3=istart+len1, je3=js2+len2−1, js4=js3−nbase, je4=js4+len2−1, A (is:ie,js:je)=A(is:ie,js:je)−A (is:ie,js3:je3)×S(js4:jse,js2:je2), istart2=istart+len1 are computed. In step S124, the subroutine bh-update is recursively called, and the target block leader istart2 and the block width len1 are assigned. Then, the subroutine exits.

Figure 28:
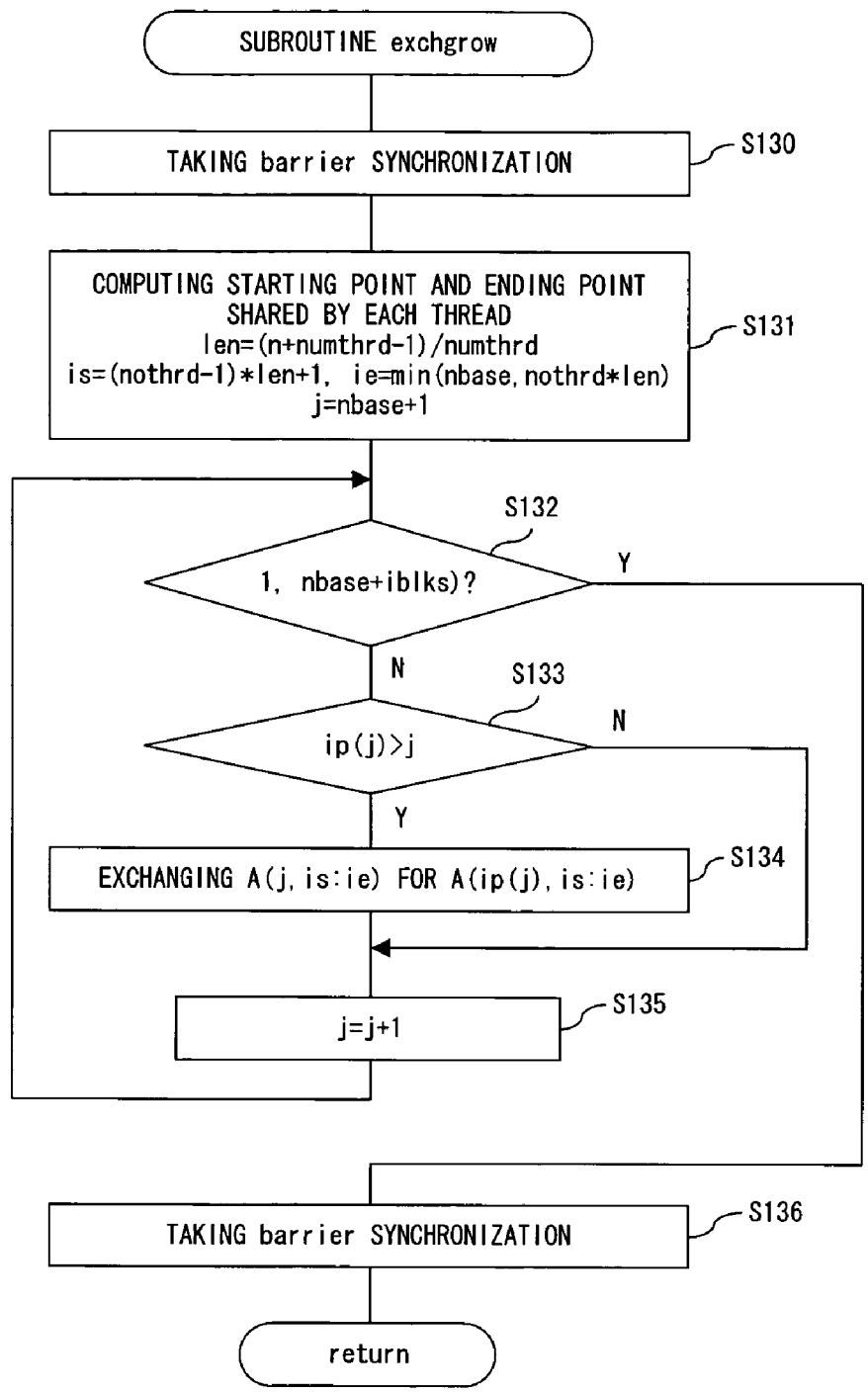
FIG. 28 is a flowchart (13) of the process of the pseudo code.

FIG. 28 is a flowchart of the subroutine exchgrow.

In step S130, barrier synchronization is taken. In step S131, the starting point and the ending point to be shared by each thread are computed. That is, len=(nbase+numthrd−1)/numthrd, is=(nothrd−1)×len+1, ie=min(nbase,nothrd×len), j=nbase+1 are computed. In step S132, it is determined whether or not j>min(n−1,nbase+iblks) is held. If the determination is YES, then control is passed to step S136. If the determination is NO, then control is passed to step S133. In step S133, it is determined whether or not jp(j)>j is held. If the determination in step S133 is NO, then control is passed to step S135. If the determination in step S133 is YES, then A (j,is:ie) is exchanged for A (ip(j),is:ie) in step S134, and control is passed to step S135. In step S135, j=j+1 is computed, and control is returned to step S132. In step S136, barrier synchronization is taken, and the subroutine exits.

Figure 29:
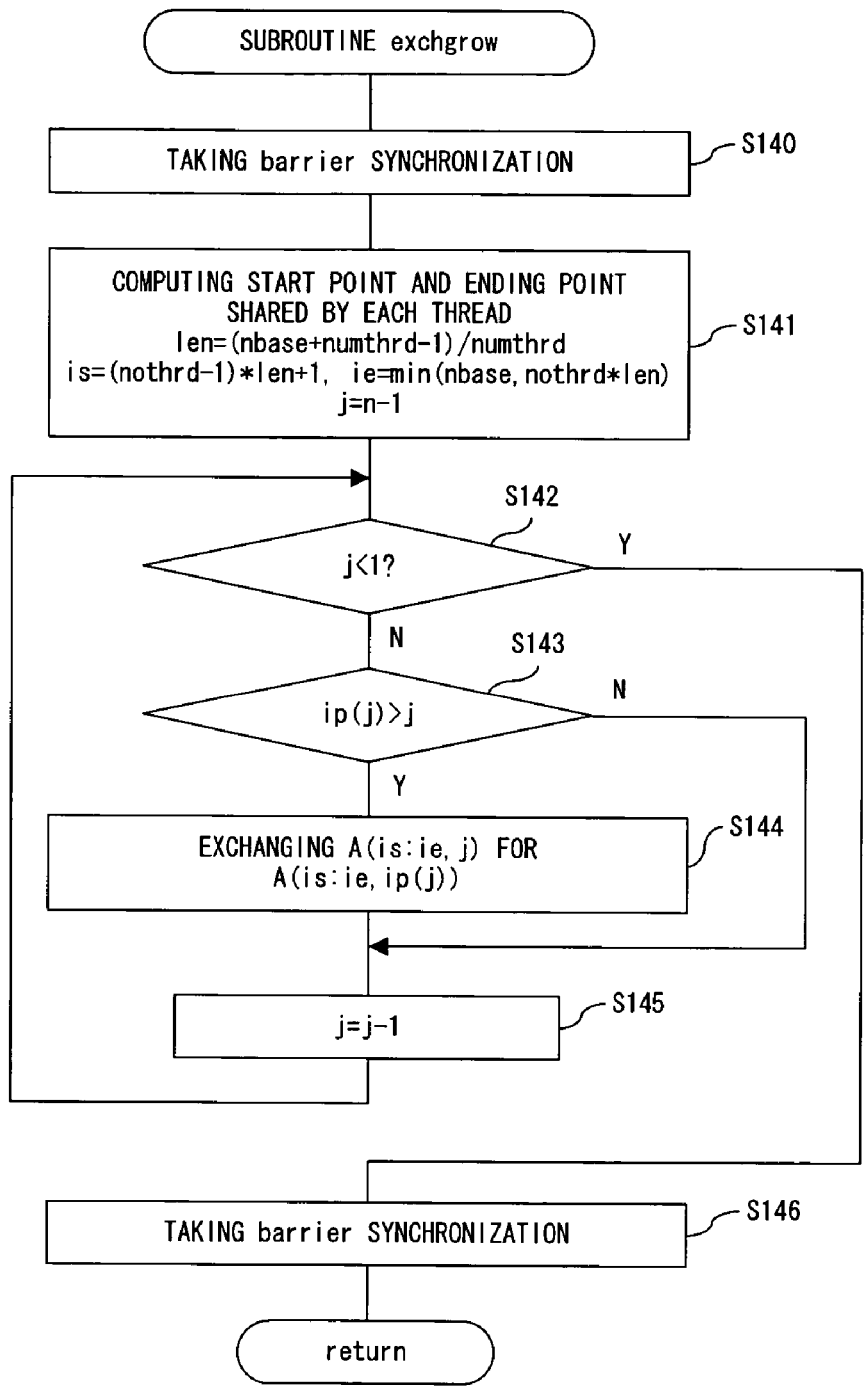
FIG. 29 is a flowchart (14) of the process of the pseudo code.

FIG. 29 is a flowchart of the subroutine exchgcol.

In step S140, barrier synchronization is taken. In step S141, the starting point and the ending point to be shared by each thread are computed. That is, len=(nbase+numthrd−1)/numthrd, is=(nothrd−1)×len+1, ie=min(nbase,nothrd×len), j=n−1 are computed, and control is passed to step S142. In step S142, it is determined whether or not j<1 is held. If the determination in step S142 is YES, control is passed to step S146. If the determination in step S142 is NO, then it is determined whether or not jp(j)>j is held in step S143. If the determination in step S143 is NO, control is passed to step S145. If the determination in step S143 is YES, then A (is:ie,j) is exchanged for A (is:ie,jp(j)) in step S144, and control is passed to step S145. In step S145, j=j−1 is set, and control is returned to step S142. In step S146, barrier synchronization is taken, and the subroutine exits.

Refer to the following textbook for the common algorithm of matrix computation.

G. H. Golub and C. F. Van Loan "Matrix Computations" The Johns Hopkins University Press, Third edition 1996

According to the present invention, a method of solving an inverse matrix, which may be in the form of a program stored on a computer readable medium, can be realized with high performance and scalability.

What is claimed is:

1. A parallel processing method for an inverse matrix for a shared memory type scalar parallel computer, comprising:
   (a) specifying a square block in a matrix for which an inverse matrix is to be obtained and which is stored in a memory area as an array A(1:n, 1:n) (where n is an order of the matrix) and storing the square block into a subarray A (nbase+1:nbase+iblk, nbase,+1:nbase+iblk) (where nbase=iblk*(i−1), i is a number of repetition, and iblk is a block width);
   (b) decomposing the matrix into upper left, left side, lower left, upper, lower, upper right, right side, and lower right blocks surrounding the square block positioned in the center and storing each divided block into subarrays A(1:nbase, 1:nbase), A(nbase+1:nbase+iblk, 1:nbase), A(nbase+iblk+1:n, 1:nbase), A(1:nbase, nbase+1:nbase+iblk), A(nbase+iblk+1:n, nbase+1:nbase+iblk), A(1:nbase, nbase+iblk+1:n), A(nbase+1:nbase+iblk, nbase+iblk+1:n), A(nbase+iblk+1:n, nbase+iblk+1:n), respectively;
   (c) dividing the lower, right side, and lower right blocks of the square block along a longer direction of a row direction or a column direction of each block, assigning each divided block and the square block to each processor and LU decomposing each assigned block by a parallel operation of the processors;
   (d) updating the left side, upper, lower, and right side blocks by a parallel operation of processors including, dividing each block along a longer direction of each block; and assigning divided blocks to each processor, the parallel operation including execution of a recursive program comprising (1) dividing blocks into a first half and a second half, (2) calculating the first half, (3) applying (1) through (3) to the second half, and further updating in parallel using the blocks updated in the recursive program on the upper left, lower left, upper right, and lower right blocks by a parallel operation of processors including, dividing each block along a longer direction of each block; and assigning divided blocks to each processor;
   (e) updating the square block in plural stages using one processor by dividing the predetermined square block so that a cost of updating the predetermined square block is within about 1% against a whole cost of calculation; and
   (f) setting_nbase of the subarray A(nbase+1:nbase+iblk, nbase+1:nbase+iblk) to nbase+iblk, and obtaining an inverse matrix of the matrix by repeating the steps (a) through (f).

2. The method according to claim 1, wherein said shared memory type scalar parallel computer comprises a plurality of processors, plural units of cache memory provided for respective processors, plural units of shared memory, and an interconnection network for connection to be made such that the units can be communicated.

3. The method according to claim 1, wherein said method is used to realize a Gauss-Jordan method for parallel computation for each block.

4. The method according to claim 1, wherein a width of a division used when each block is divided for parallel computation is set such that a total amount of computation of square blocks not processed in parallel can be about 1% of entire computation from a size of a matrix from which an inverse matrix is obtained and from a number of processors available in a parallel process.

5. A computer readable medium storing a program for realizing a parallel processing method for an inverse matrix for a shared memory type scalar parallel computer, comprising:
   (a) specifying a square block in a matrix for which an inverse matrix is to be obtained and which is stored in a memory area as an array A(1:n, 1:n) (where n is an order of the matrix) and storing the square block into a subarray A (nbase+1:nbase+iblk, nbase,+1:nbase+iblk) (where nbase=iblk*(i−1), i is a number of repetition, and iblk is a block width);

(b) decomposing the matrix into upper left, left side, lower left, upper, lower, upper right, right side, and lower right blocks surrounding the square block positioned in the center and storing each divided block into subarrays A(1:nbase, 1:nbase), A(nbase+1:nbase+iblk, 1:nbase), A(nbase+iblk+1:n,1:nbase), A(1:nbase, nbase+1:nbase+iblk), A(nbase+iblk+1:n, nbase+1:nbase+iblk), A(1:nbase, nbase+iblk+1:n), A(nbase+1:nbase+iblk, nbase+iblk+1:n), A(nbase+iblk+1:n, nbase+iblk+1:n), respectively;

(c) dividing the lower, right side, and lower right blocks of the square block along a longer direction of a row direction or a column direction of each block, assigning each divided block and the square block to each processor and LU decomposing each assigned block by a parallel operation of the processors;

(d) updating the left side, upper, lower, and right side blocks by a parallel operation of processors including, dividing each block along a longer direction of each block; and assigning divided blocks to each processor, the parallel operation including execution of a recursive program comprising (1) dividing blocks into a first half and a second half, (2) calculating the first half, (3) applying (1) through (3) to the second half, and further updating in parallel using the blocks updated in the recursive program on the upper left, lower left, upper right, and lower right blocks by a parallel operation of processors including, dividing each block along a longer direction of each block; and assigning divided blocks to each processor;

(e) updating the square block in plural stages using one processor by dividing the predetermined square block so that a cost of updating the predetermined square block is within the 1% against a whole cost of calculation; and (f) setting_nbase of the subarray A(nbase+1:nbase+iblk, nbase+1:nbase+iblk) to nbase+iblk, and obtaining an inverse matrix of the matrix by repeating the steps of (a) through (f).

6. The computer readable medium according to claim 5, wherein
said shared memory type scalar parallel computer comprises a plurality of processors, plural units of cache memory provided for respective processors, plural units of shared memory, and an interconnection network for connection to be made such that the units can be communicated.

7. The computer readable medium according to claim 5, wherein
said method is used to realize a Gauss-Jordan method for parallel computation for each block.

8. The computer readable medium according to claim 5, wherein
a width of a division used when each block is divided for parallel computation is set such that a total amount of computation of square blocks not processed in parallel can be about 1% of entire computation from a size of a matrix from which an inverse matrix is obtained and from a number of processors available in a parallel process.

9. A shared memory type scalar parallel computer, comprising:
a plurality of processors;
plural units of cache memory provided for respective ones of said processors;
plural units of shared memory that is shared among said processors; and
an interconnection network for connecting said processors, said shared memory units and said cache memory units,
wherein said shared memory type scalar parallel computer is configured and arranged to perform a parallel processing method for an inverse matrix that includes:

(a) specifying a square block in a matrix for which an inverse matrix is to be obtained and which is stored in a memory area as an array A(1:n, 1:n) (where n is an order of the matrix) and storing the square block into a subarray A (nbase+1:nbase+iblk, nbase,+1:nbase+iblk) (where nbase=iblk*(i−1), i is a number of repetition, and iblk is a block width);

(b) decomposing the matrix into upper left, left side, lower left, upper, lower, upper right, right side, and lower right blocks surrounding the square block positioned in the center and storing each divided block into subarrays A(1:nbase, 1:nbase), A(nbase+1:nbase+iblk, 1:nbase), A(nbase+iblk+1:n, 1:nbase), A(1:nbase,1 nbase+1:nbase+iblk), A(nbase+iblk+1:n, nbase+1:nbase+iblk), A(1:nbase, nbase+iblk+1:n), A(nbase+1:nbase+iblk, nbase+iblk+1:n), A(nbase+iblk+1:n, nbase+iblk+1:n), respectively;

(c) dividing the lower, right side, and lower right blocks of the square block along a longer direction of a row direction or a column direction of each block, assigning each divided block and the square block to each processor and LU decomposing each assigned block by a parallel operation of the processors;

(d) updating the left side, upper, lower, and right side blocks by a parallel operation of processors including, dividing each block along a longer direction of each block; and assigning divided blocks to each processor, the parallel operation including execution of a recursive program comprising (1) dividing blocks into a first half and a second half, (2) calculating the first half, (3) applying (1) through (3) to the second half, and further updating in parallel using the blocks updated in the recursive program on the upper left, lower left, upper right, and lower right blocks by a parallel operation of processors including, dividing each block along a longer direction of each block; and assigning divided blocks to each processor;

(e) updating the square block in plural stages using one processor by dividing the predetermined square block so that a cost of updating the predetermined square block is within about 1% against a whole cost of calculation; and (f) setting nbase of the subarray A(nbase+1:nbase+iblk, nbase+1:nbase+iblk) to nbase+iblk, and obtaining an inverse matrix of the matrix by repeating the steps (a) through (f).

10. The shared memory type scalar parallel computer according to claim 9, further comprising realizing a Gauss-Jordan method for parallel computation for each block.

11. The shared memory type scalar parallel computer according to claim 9, wherein a width of a division used when each block is divided for parallel computation is set such that a total amount of computation of square blocks not processed in parallel can be about 1% of entire computation from a size of a matrix from which an inverse matrix is obtained and from a number of processors available in a parallel process.

* * * * *